United States Patent
Takahashi et al.

[19]

[11] Patent Number: 5,966,354
[45] Date of Patent: Oct. 12, 1999

[54] DRIVE APPARATUS FOR OBJECTIVE LENS

[75] Inventors: Naomasa Takahashi, Tokyo; Akihiro Kasahara, Chiba-ken, both of Japan

[73] Assignee: Kabushiki Kaisha Toshiba, Kawasaki, Japan

[21] Appl. No.: 08/745,127

[22] Filed: Nov. 8, 1996

[30] Foreign Application Priority Data

| Nov. 10, 1995 | [JP] | Japan | 7-293168 |
| Nov. 10, 1995 | [JP] | Japan | 7-293169 |

[51] Int. Cl.$^6$ .................................................. G11B 7/00
[52] U.S. Cl. ................... 369/44.27; 369/44.14; 369/44.21
[58] Field of Search ................ 369/112, 44.37, 369/44.38, 94, 44.14, 44.23, 44.17, 44.18, 44.19, 44.21, 44.22, 44.27, 58

[56] References Cited

U.S. PATENT DOCUMENTS

| 5,216,534 | 6/1993 | Boardman et al. | 369/44.18 |
| 5,235,581 | 8/1993 | Miyagawa | 369/112 |
| 5,687,154 | 11/1997 | Tsuchiya et al. | 369/112 |
| 5,729,510 | 3/1998 | Kasahara et al. | 369/44.14 |

FOREIGN PATENT DOCUMENTS

| 0 228 055 | 7/1987 | European Pat. Off. . |
| 294 490 | 12/1988 | European Pat. Off. . |
| 0 470 807 | 2/1992 | European Pat. Off. . |
| 0 712 122 A2 | 5/1996 | European Pat. Off. . |
| 0 727 776 A1 | 8/1996 | European Pat. Off. . |
| 07037259 | 2/1995 | Japan . |
| 8138265 | 5/1996 | Japan . |

OTHER PUBLICATIONS

Patent Abstracts of Japan, vol. 017, No. 366 (P–1571), Jul. 9, 1993 JP 05 054406 A (Matsushita Electric Ind Co Ltd), Mar. 5, 1993.

*Primary Examiner*—Thang V. Tran
*Attorney, Agent, or Firm*—Pillsbury Madison & Sutro LLP

[57] ABSTRACT

A first objective lens and a second objective lens are fixedly mounted on a lens holder. The lens holder has four magnetic members embedded in a side thereof about an axis of rotation. The magnetic members are associated with coils respectively. The lens holder is rotatable supported by a support which has four permanent magnets fixedly mounted on a side thereof corresponding to the four coils. A pair of the magnets located opposite to each other is for the focusing control and the other pair of the magnets located opposite to each other is for the tracking control and the objective lens switching control. When the coils corresponding to the magnets are loaded with a switching signal, they turns the lens holder to switch the objective lenses from one to the other. When the coils corresponding to the magnets are loaded with a tracking drive signal, they perform the tracking control. When the coils corresponding to the magnets are loaded with a focusing drive signal, they perform the focusing control. At the beginning of operation, the objective lens drive apparatus can be initialized by feeding the switching signal to either pair of the coils so that the objective lens is set across a light path.

14 Claims, 18 Drawing Sheets

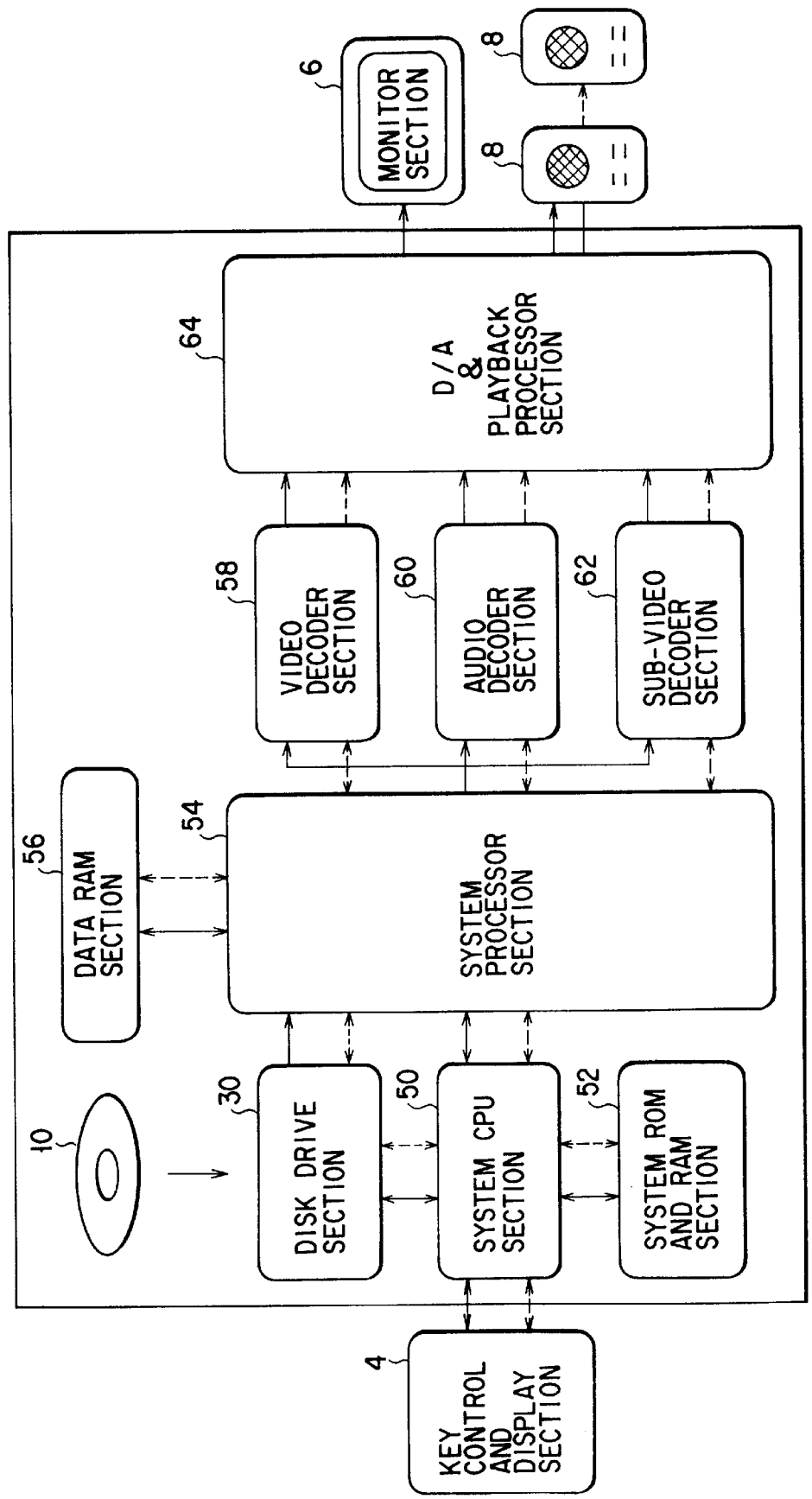
F I G. 1

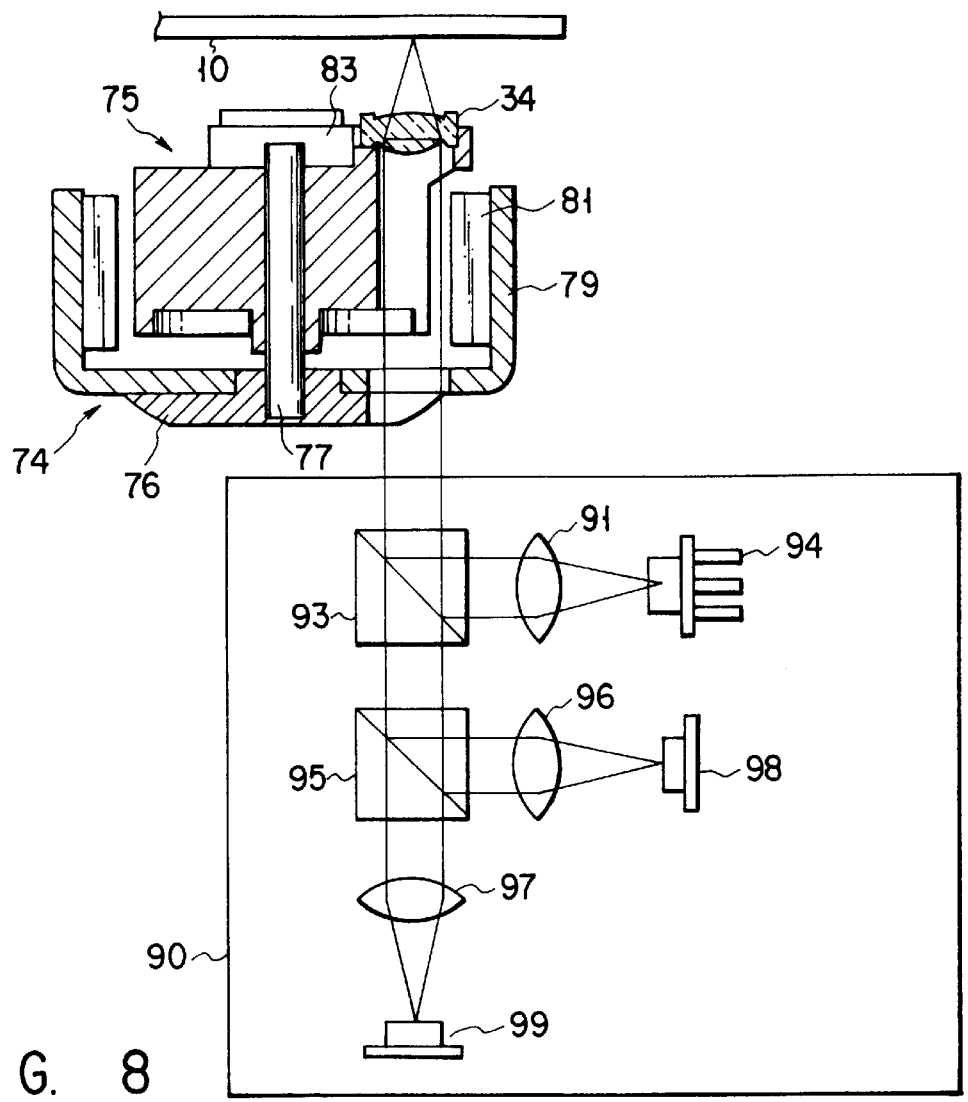
F I G. 8
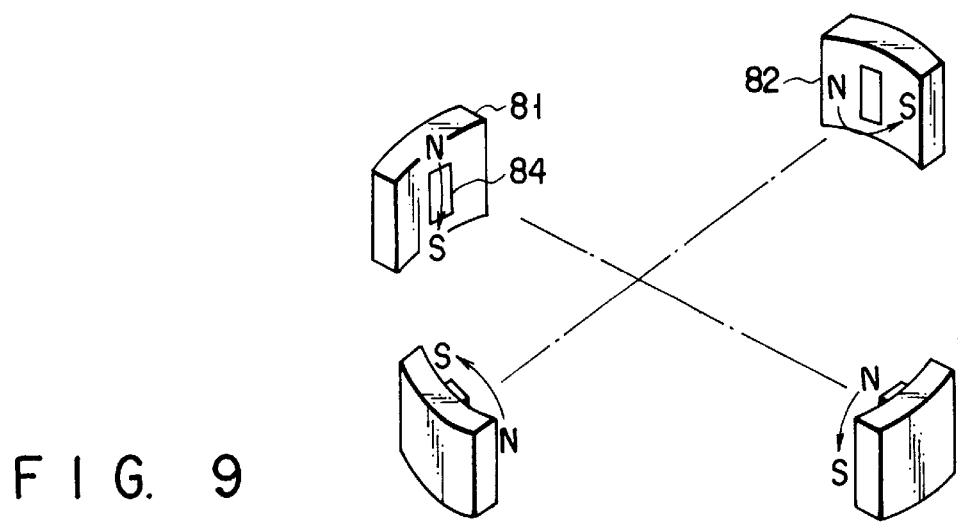
F I G. 9

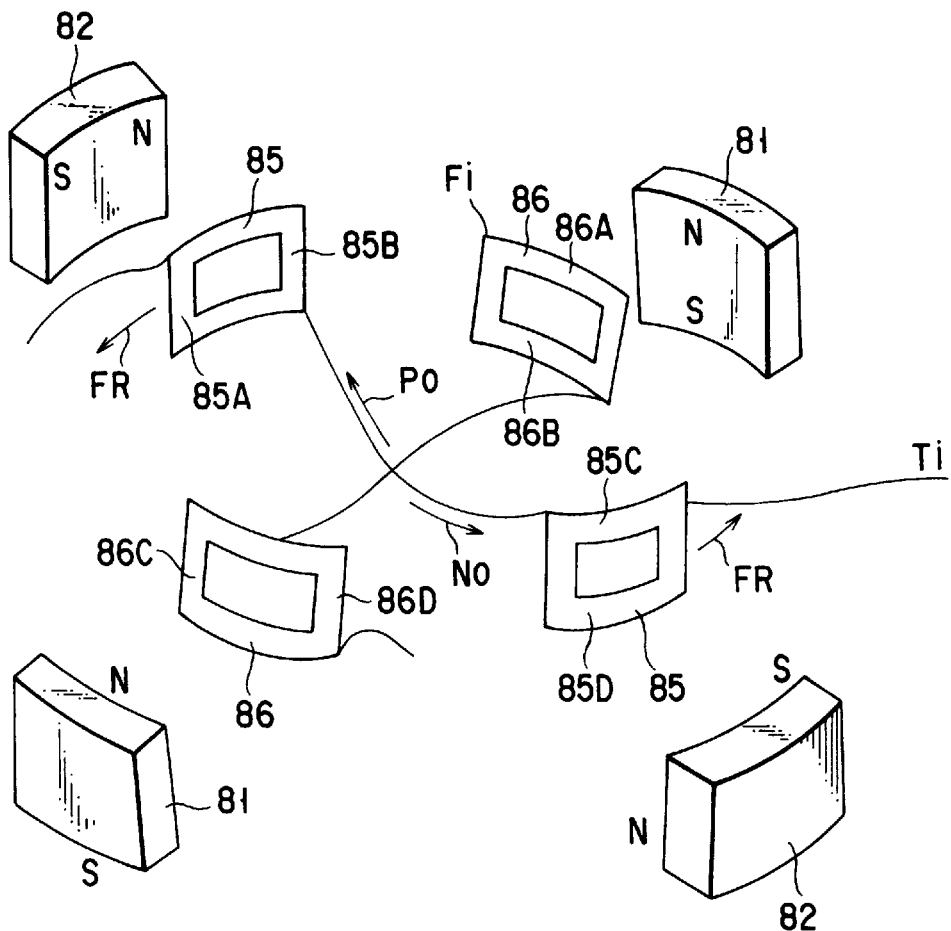
F I G. 11
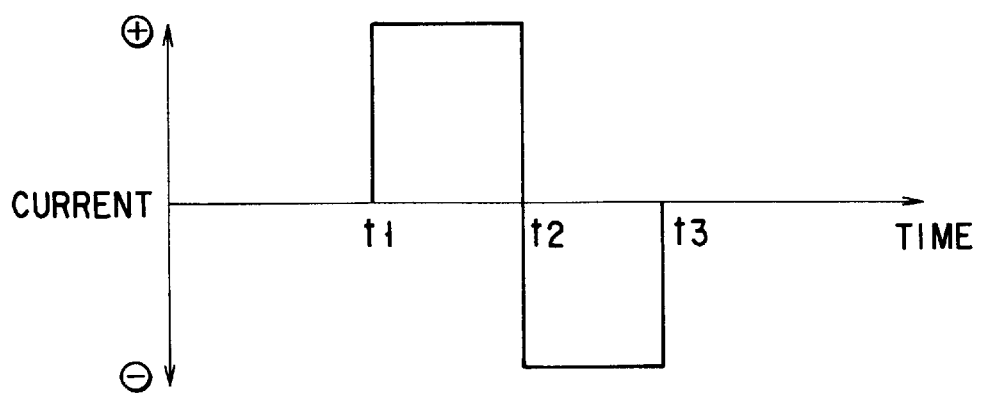
F I G. 12

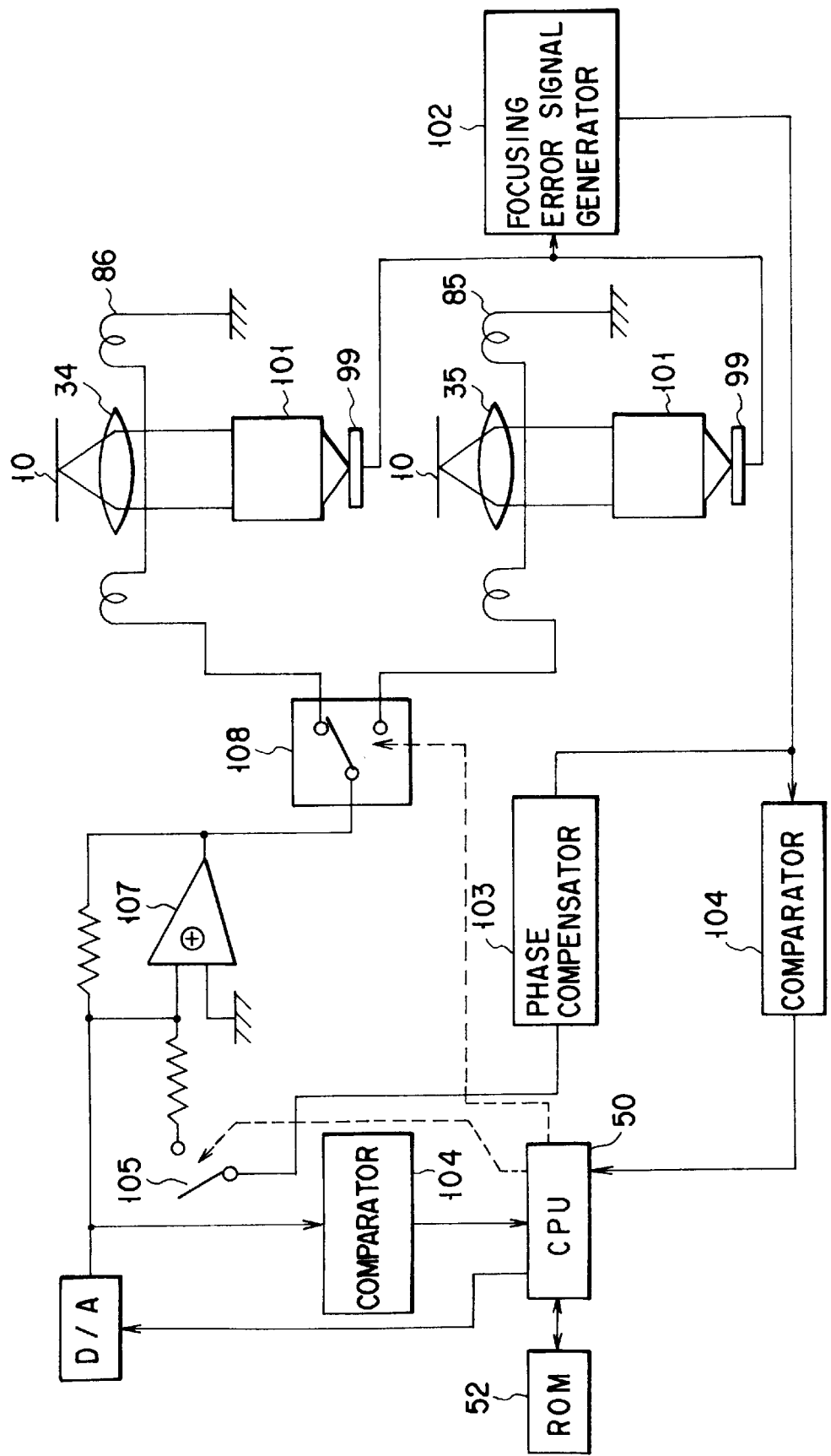
F I G. 15

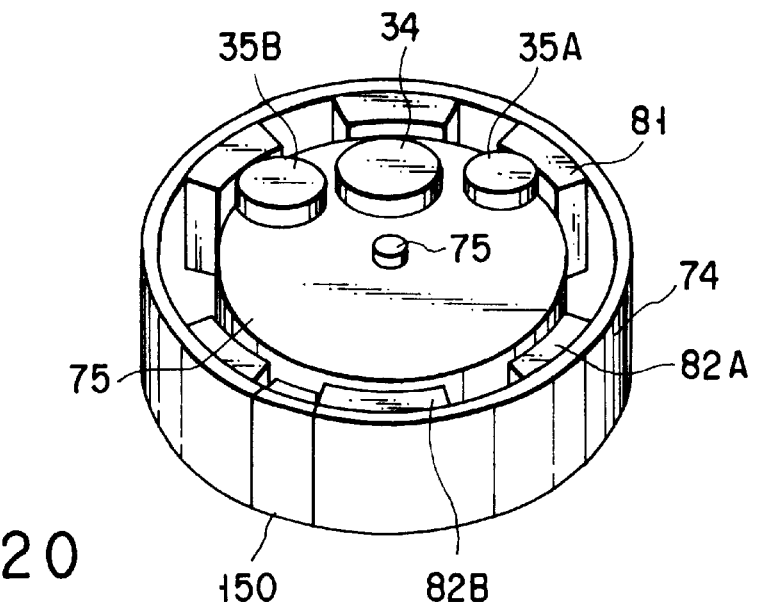
F I G. 20
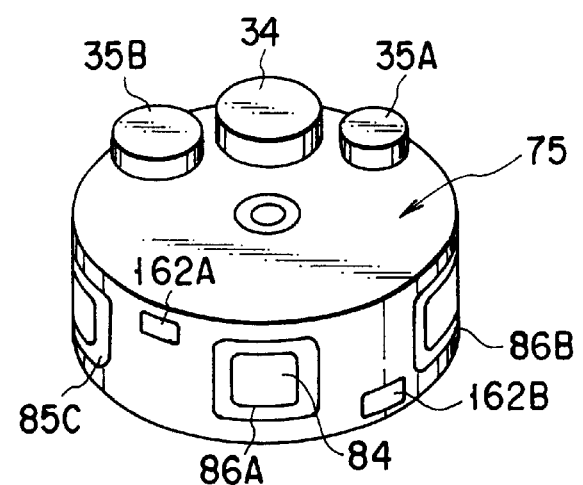
F I G. 21A
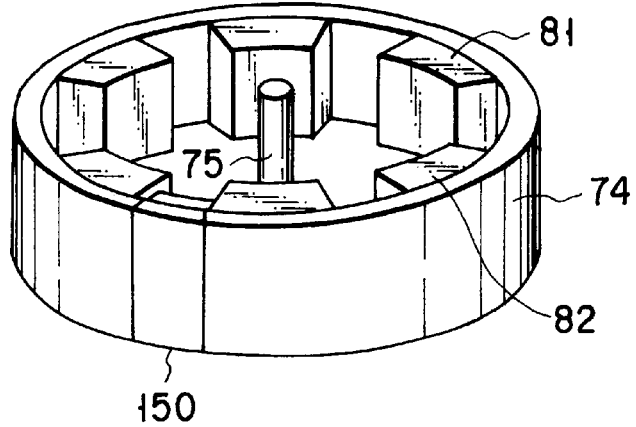
F I G. 21B

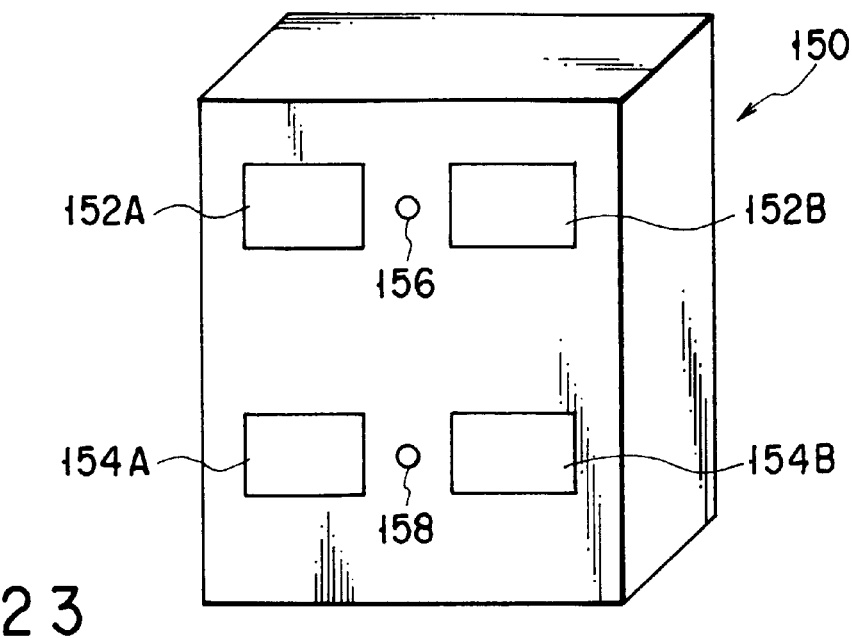
F I G. 23
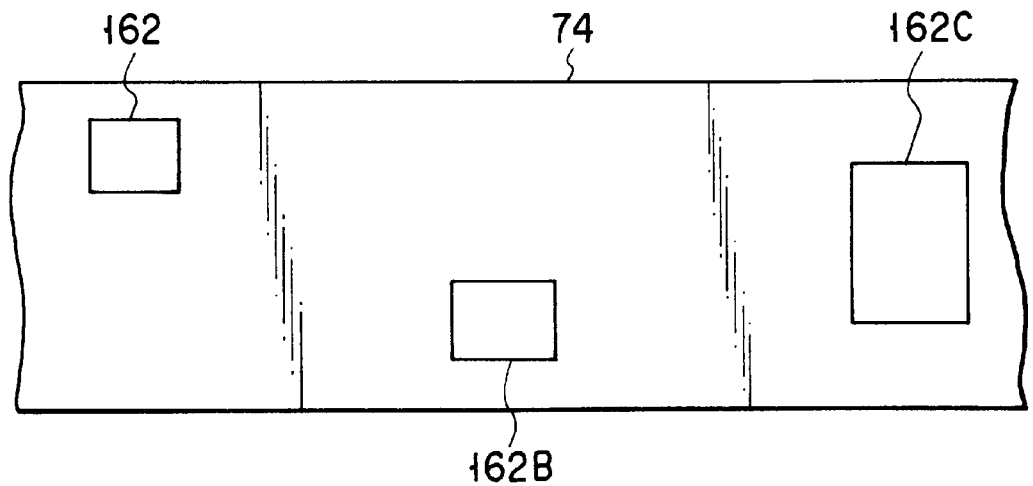
F I G. 24

DRIVE APPARATUS FOR OBJECTIVE LENS

BACKGROUND OF THE INVENTION

1. Field of the Invention

The present invention relates to an objective lens drive apparatus installed in an optical disk system and particularly, to a drive apparatus having objective lenses with different numerical apertures, arranged for switching from one to the other depending on the type of a recording medium to be scanned, and having an initialization function wherein one of the objective lenses is set to a predetermined location at the beginning of operation.

2. Description of the Related Art

Such objective lens drives apparatuses have been developed for use with playback systems for scanning a variety of advanced optical data recording mediums including an optical disk and an opto-magnetic disk. Some of the objective lens drive apparatuses are now available in the market for driving compact disks and CD-ROM disks.

Some types of objective lens drives provided for not only playback but also recording, particularly, with a magnet-optical or phase-change method. Most of the recording types are standardized for specific application. However, recently super-density types of the optical disk such as DVD format for maximizing the recording density have been developed and introduced. The optical disk of such a super-density type has pits of record unit formed much smaller in size than those of the common CD type to be scanned at a higher accuracy. Also, the optical disk of such a type has a substrate with a different thickness from that of the CD type. In addition, a playback system for the optical disk of such a super-density type employs a laser beam of a shorter wavelength to scan the pits, and an objective lens of a larger numerical aperture to focus a smaller spot of the laser beam on the optical disk.

As a variety of optical disks are employed, the drive unit may encounter a difficulty to scan each of the disks at a constant accuracy. This will require a user to have two or more drive units corresponding to the different types of recording medium to be scanned.

For overcoming the above drawback, a method is proposed as disclosed in U.S. Pat. No. 5,235,581 where a plurality of optical heads with different focal lengths are provided in one single optical disk drive. More specifically, the disk drive of the type has two optical heads arranged for performing tracking actions independently from each other thus allowing the recording and playing back of conventional optical disks such as CD as well as of super-density type.

However, the two optical heads are located opposite to each other about the center of the optical disk and therefore are not close to each other. Accordingly, when the optical disk of a cartridge (or casing) type which has a window for scanning (such as a CD-ROM or MO disk) is selected, the conventional optical disk drive does not allow either of two objective lenses to be located beneath the aperture of the window which has a substantially limited size. Furthermore, the optical disk drives of any type should be low in cost and the installation of such two optical heads will be expensive.

It is thus desired to provide an improved optical head which includes two or more different objective lenses arranged for switching from one to another. More preferably, such an improved optical head is capable of being initialized wherein one of the objective lenses is selected and presented at the beginning of operation. Furthermore, such an improved optical head is preferably adapted for identifying the type of a recording medium or optical disk to be scanned with the selected objective lens and thus allowing the selection of a corresponding type of the objective lens for the optical disk.

SUMMARY OF THE INVENTION

It is an object of the present invention to provide an objective lens drive apparatus capable of selectively switching to an objective lens suited for recording and playing back a specific type of optical data recording medium as well as an objective lens(s) suited for recording and playing back a conventional type of optical data recording medium, and having an initialization function for selecting one of the objective lenses for a predetermined location at the beginning of operation.

More specifically, it is an object of the present invention to provide a drive apparatus for selectively driving one of numerous objective lenses of different optical characteristics to produce a desired size of a light beam spot at a focus point so that an optical disk medium of a higher class can be switched to of a lower class.

It is a further object of the present invention to provide an objective lens drive apparatus equipped with at least two or more objective lenses of different numerical apertures corresponding to different standard types of optical data receding medium and capable of switching to the desired objective lens depending on the type of optical data recording medium to be scanned.

An objective lens drive apparatus according to the present invention comprises: a lens holder carrying a first objective lens and a second objective lens; a supporting means for allowing the lens holder to be turned about an axis of rotation dislocated from the installation centers of the objective lenses and moved along the direction of the axis; a first electromagnetic driving means having at least first magnets and first coils for turning the lens holder about the axis when the first objective lens is selected; and a second electromagnetic driving means having at least second magnets and second coils for moving the lens holder in parallel to the axis when the first objective lens is selected. When the lens holder turns and departs from a range of the tracking control for switching from the first objective lens to the second objective lens, the first magnets and the second coils act in a combination as a third electromagnetic driving means to turn the lens holder about the axis and the second magnets and the first coils act in a combination as a fourth electromagnetic driving means to move the lens holder in parallel to the direction of the axis.

Accordingly, the objective lens drive apparatus of the present invention is of a multi-lens type thus minimizing the consumption of energy and improving the oscillation characteristic.

Also, an objective lens drive apparatus according to the present invention comprises: a lens holder carrying a first objective lens and a second objective lens; a supporting means for allowing the lens holder to be turned about an axis of rotation dislocated from the installation centers of the objective lenses and moved along the direction of the axis; a lens holder driving assembly including a first electromagnetic driving means having at least first magnets and first coils for turning the lens holder about the axis when the first objective lens is selected, and a second electromagnetic driving means having at least second magnets and second coils for moving the lens holder in parallel to the axis when the first objective lens is selected. When the lens holder turns and departs from a range of the tracking control for switching from the first objective lens to the second objective lens, the first magnets and the second coils act in a combination as a third electromagnetic driving means to turn the lens holder about the axis and the second magnets and the first coils act in a combination as a fourth electromagnetic driving means to move the lens holder in parallel to the direction of the axis; and an objective lens initializing means for initializing the apparatus by feeding an objective lens switching drive signal to either the first or second coils so that the first and second objective lenses are set at their predetermined locations.

Furthermore, an objective lens drive apparatus according to the present invention comprises: a first and a second objective lens having different optical characteristics respectively for focusing a beam of light on an optical recording medium; a lens holder provided with an axis of rotation and supporting the first and second objective lenses for moving in the directions of their optical axes and turning about the axis of rotation; an optical system defining an optical path along which the beam of light is transmitted to selected one of the first and second objective lenses; a lens holder driving means for turning the lens holder to selectively locate the first or second objective lens across the optical path, adjustably turning the same to scan a desired region of the optical recording medium with the beam of light from the selected objective lens, and adjustably moving the same in the direction of the optical axis to maintain the beam of light in focus; and an initialization setting means for turning the lens holder by feeding an initialization selecting signal to the drive apparatus so that selected one of the first and second objective lenses is located across the optical path.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic block diagram of an optical disk drive system showing one embodiment of the present invention;

FIG. 8 is a schematic view showing the optical pickup with an optical system linked to the optical pickup;

FIG. 9 is a schematic view explaining the principle of magnetically lifting up the lens holder in the optical pickup shown in FIG. 5;

FIG. 11 is a perspective view showing a magnetic circuit for switching the objective lens in the optical pickup shown in FIG. 5;

FIG. 12 is a waveform diagram of a signal for actuating the objective lens switching action of the magnetic circuit shown in FIG. 11;

FIG. 15 is a block diagram of a circuit for identifying the type of the objective lens of the objective lens drive apparatus shown in FIG. 5 and then the type of the optical disk loaded to the optical disk system shown in FIG. 1;

FIG. 20 is a perspective view of an objective lens drive apparatus showing another embodiment of the present invention;

FIGS. 21A and 21B are exploded perspective views of the objective lens drive apparatus shown in FIG. 20;

FIG. 23 is a schematic perspective view of a sensor unit shown in FIG. 20;

FIG. 24 is a schematic plan view of an arrangement of mirrors of the objective lens drive apparatus located corresponding to the sensor unit shown in FIG. 20.

DETAILED DESCRIPTION OF THE PREFERRED EMBODIMENTS

An optical disk player equipped with an objective lens drive apparatus according to one embodiment of the present invention will be described referring to the accompanying drawings.

Figure 2:
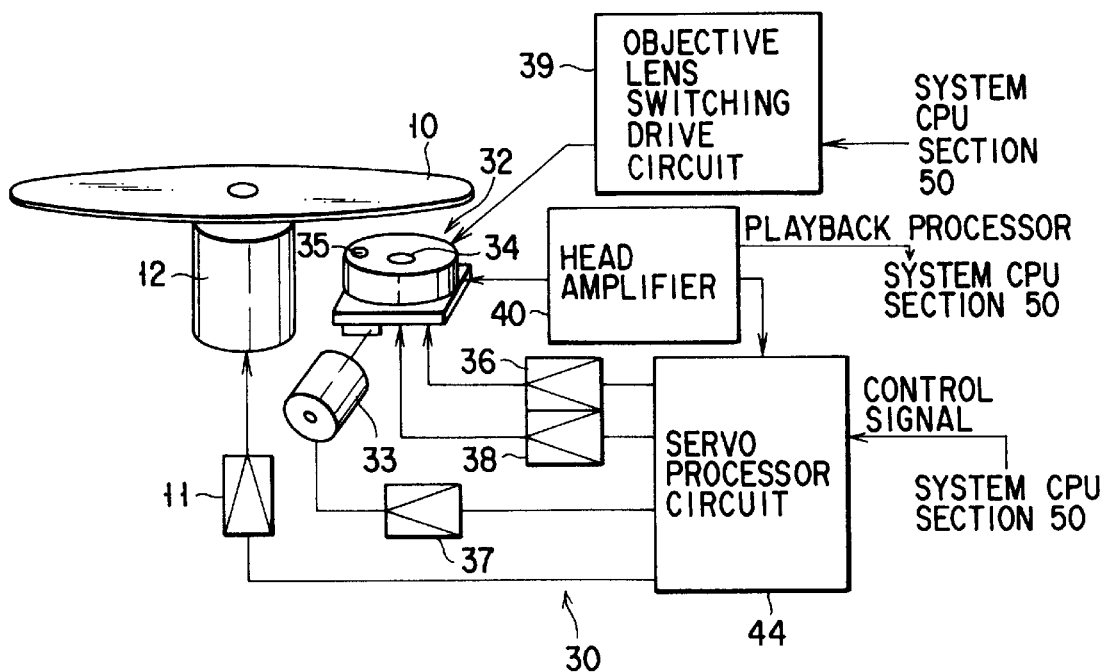
FIG. 2 is a block diagram of a part of the disk drive system shown in FIG. 1.
Figure 3:
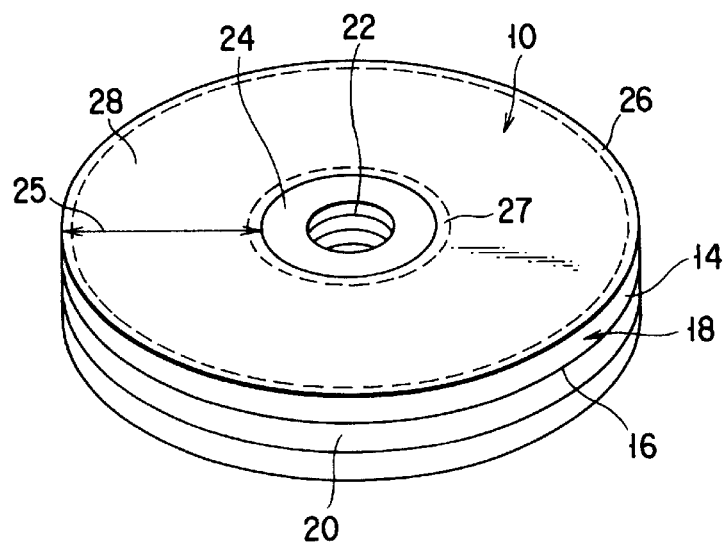
FIG. 3 is a schematic perspective view of the construction of an optical disk shown in FIG.1.

FIG. 1 is a block diagram of the optical disk player for reproducing data from an optical disk according to the present invention. FIG. 2 is a block diagram of disk drive unit for driving the optical disk shown in FIG. 1. FIG. 3 illustrates a construction of the optical disk shown in FIGS. 1 and 2.

In the optical disk player of FIG. 1, recorded data including video, sub-video and audio data are retrieved from the optical disk 10 by a user operating a key control and display unit 4 and converted into video signals and an audio signal respectively before transmitted to a monitor 6 and loud speakers 8 for playing back as an image and a sound.

The optical disk 10 is well known and available in various constructions. The optical disk shown in FIG. 3 is for example of a super-density recording type for storage of data at a higher density, which comprises a pair of structures 18, each structure having a recording or optical reflective layer 16 disposed on a transparent substrate 14. The two structures 18 are bonded by an adhesive layer 20 to each other with their recording layers 16 locating inside. The optical disk 10 of that type has a center hole 22 provided in the center for accepting the spindle of a spindle motor 12. A clamping region 24 is provided about the center hole 22 allowing the optical disk 10 to be securely clamped during rotation.

A data recording region 25 of the optical disk 10 extends between the clamping region 24 and the outer edge. The optical disk 10 shown in FIG. 3 has the data recording region 25 on either side thereof. The data recording region 25 includes a lead-out area 26 at the outward end where no data is recorded and a lead-in area 27 at the inward end where no data is recorded. A data recording area 28 is between the lead-in area 26 and the lead-out area 27. There is a spiral continuous track formed on the data recording area 28 of each recording layer 16. The recording track is separated into sectors. The record is made on the basis of a sector. The data recording area 28 of the recording region 25 is an actual data storage area where control data, main video data, sub-video data, and audio data are recorded in the form of physical variations such as pits and lands. When the optical disk 10 is of a read-only type, a row of pits are first formed in the transparent layer 14 by a stamper. A reflective layer is then deposited by vapor deposition on the transparent layer 14 in which the pits are formed thus producing the recording layer 14. The optical disk 10 of the read-only type allows the row of pits to serve as a track while no groove of track is formed. The transparent substrate 14 of the super-density recording optical disk 10 is as small as 0.6 mm in thickness which is substantially a half the thickness, 1.2 mm, of the transparent substrate of a known CD or CD-ROM disk.

For playback, the optical disk 10 is loaded on the optical disk player, driven, and scanned by a light beam in the disk drive unit 30. More specifically, the optical disk 10 is placed on and driven by a spindle motor 12 which is controlled by a motor drive circuit 11 as shown in FIG. 2. Mounted beneath the optical disk 10 is an optical head or pickup 32 for focusing a light or laser beam. The optical pickup 32 includes an objective lens 35 of small numerical aperture for a CD or CD-ROM disk and an objective lens 34 of large numerical aperture for a super-density recording disk such as shown in FIG. 3. Also included is an objective lens switching drive circuit 39 for generating a drive signal for switching between the two objective lenses 34 and 35. When the objective lens switching circuit 39 identifies the type of the optical disk 10 loaded, either CD type or super-density type, its drive signal selects and locates one of the two objective lenses 34 and 35 across the light path of laser beam.

The optical head or pickup 32 is mounted on a guide mechanism for radial movement along the optical disk 10 to scan the data recording region 25 and more particularly, the data recording area 28. The radial movement along the optical disk 10 is controlled by a feed motor 33 driven with a drive signal from a drive circuit 37. Each of the objective lenses 34 and 35 in the optical disk player is arranged movable along its optical axis, as explained later in more details. The movement along the optical axis of the objective lens 34 or 35 is controlled by a drive signal from a focusing drive circuit 36 so that it focuses to produce a small beam spot on the recording layer 16. The objective lenses 34 and 35 are also responsive to a tracking signal from a tracking drive circuit 38 for small movement radially of the optical disk 10, as explained later in more detail, thus allowing the light beam to correctly follow and scan the track on the recording layer 16 of the optical disk 10.

The optical pickup 32 upon receiving a reflected light beam from the optical disk 10 produces and transmits a detection signal via a head amplifier 40 to a servo processor circuit 44. In response to the detection signal, the servo processor circuit 44 generates a focusing signal, a tracking signal, and a motor control signal which are then fed to their corresponding drive circuits 36, 38, and 11. This permits the objective lens 34 or 35 to be aligned in focusing and tracking and the spindle motor 12 to be rotated at a given rate of rotation so that the light beam follow the track on the recording layer 16, for example, at a constant linear speed. When the servo processor circuit 44 is supplied with an external control signal or an access signal from a system CPU 50, it drives the drive circuit 37 to actuate the radial movement of the optical head 32 along the optical disk 10 for accessing a desired sector on the recording layer 16. Then, a playback data accessed and retrieved is amplified by the head amplifier 40 and released from the disk drive unit 30.

The playback data retrieved is transmitted via the system CPU 50, which is controlled by a program saved in a system ROM and RAM unit 52, and a system processor unit 54 to a data RAM unit 56 for temporal storage. The playback data is then picked up and classified by the system processor unit 54 into video data, audio data, and sub-video data. The video, audio, and sub-video data are transmitted to a video decoder 58, an audio decoder 60, and a sub-video decoder 62 respectively. The decoded forms of the video, audio, and sub-video data are fed to a D/A and playback unit 64 where they are converted to video, audio, and sub-video signals of analog mode and subjected to mixing. The video and sub-video signals are fed to the monitor 6 for reproduction of an image and the audio signal is fed to the loud speakers 8 for reproducing a sound.

The optical pickup 32 shown in FIG. 2 and its guide mechanism will now be described in more details referring to FIGS. 4 to 11.

Figure 4:
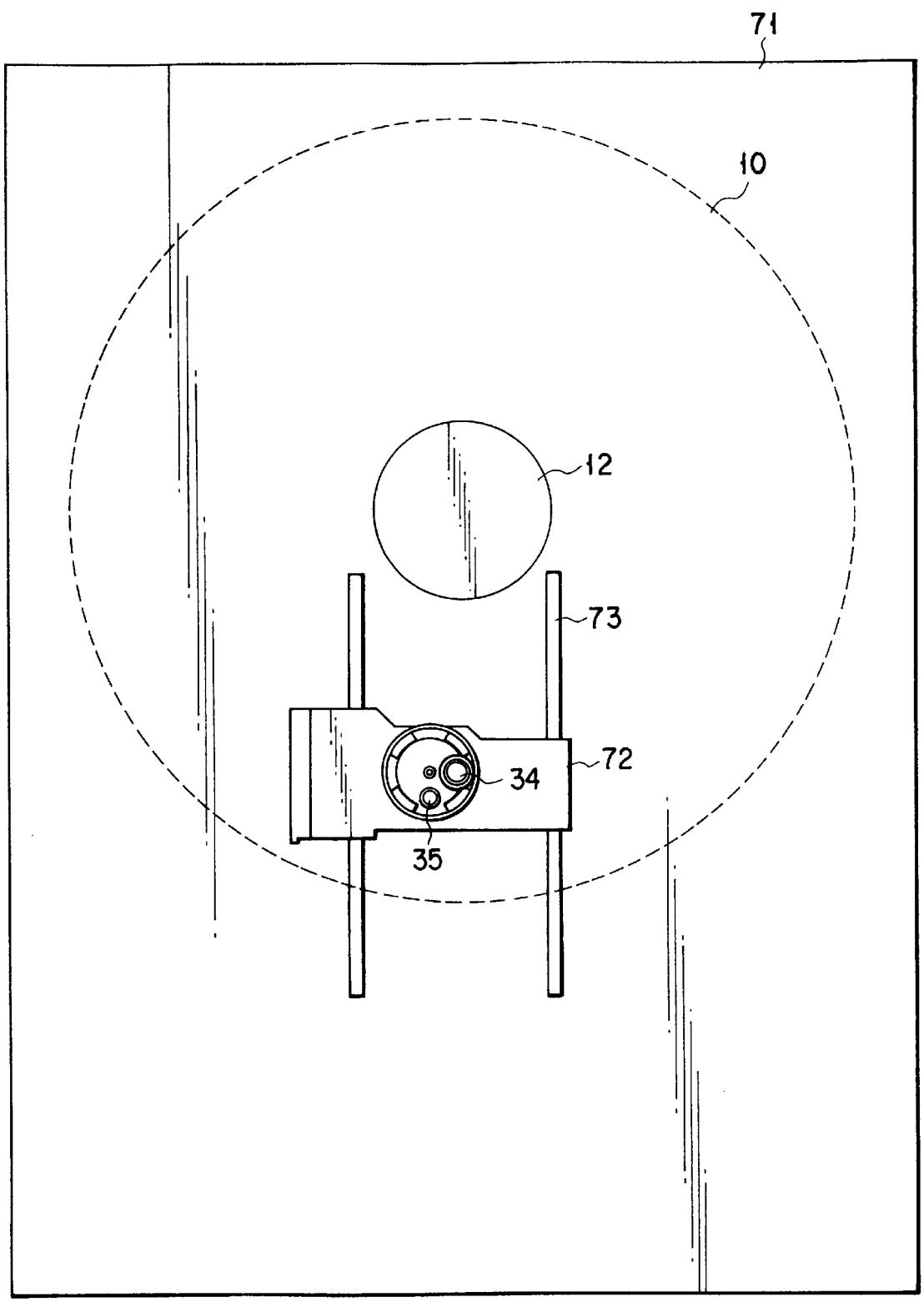
FIG. 4 is a schematic plan view of an objective lens drive apparatus for selecting and driving an objective lens shown in FIG. 2.

The spindle motor 12 is fixedly mounted on a base 71 shown in FIG. 4. The optical disk 10 driven by the spindle motor 3 is supported by a chucking means (not shown). Beneath the optical disk 10, a pair of guide rails 73 are mounted in parallel to each other on the base 71 extending radially of the optical disk 10. A carriage 72 is mounted for running on the rails 73 and carries on the top thereof an objective lens actuator 70 shown in FIG. 5.

Figure 5:
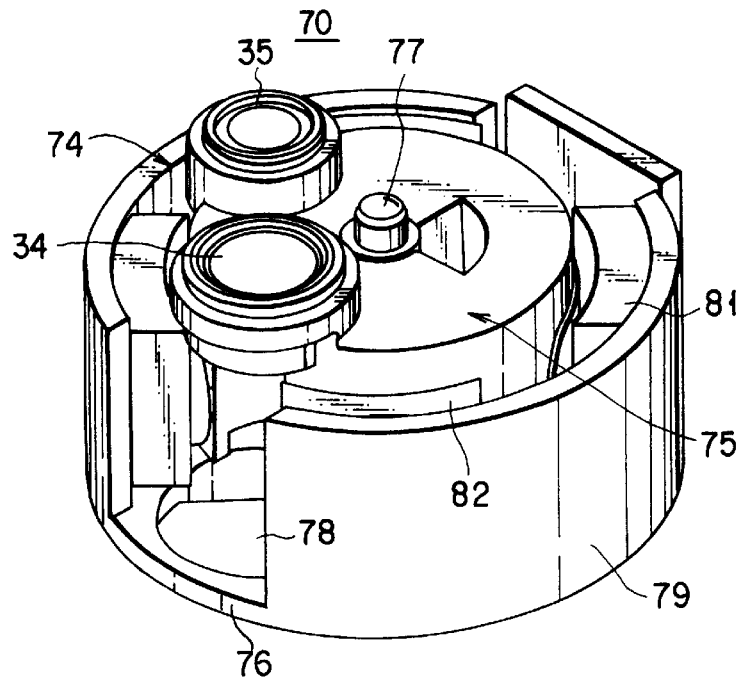
FIG. 5 is a perspective view of an optical pickup in the objective lens drive apparatus shown in FIG. 4.
Figure 6:
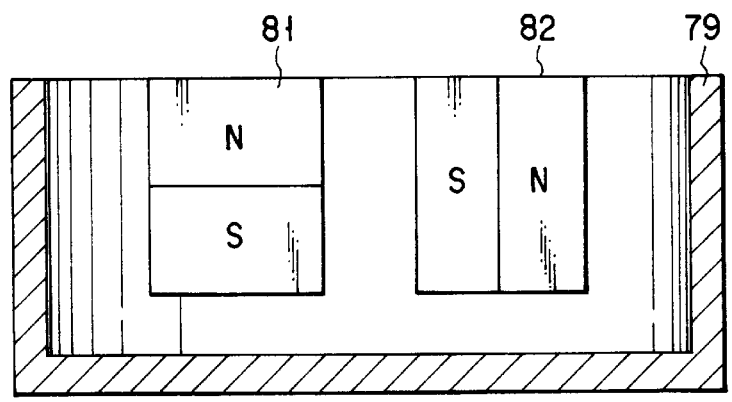
FIG. 6 is a cross sectional view showing an inner structure of the objective lens drive apparatus shown in FIG. 5.

The objective lens actuator 70 comprises a lens holder 75 arranged liftable and rotatable, and a lens holder support 74 accommodating the lens holder 75, as shown in FIG. 5. The lens holder support 74 includes an actuator base 76 anchored to the carriage 72 and provided with an opening 78 for passing the laser beam. A capstan 77 is mounted to the center of the actuator base 76. The lens holder support 74 also includes a couple of arcuate yokes 79 provided circumferentially about the capstan 77. A pair of arcuate permanent magnets 81 and 92 are mounted to the inner side of each arcuate yoke 79. The two pairs of the magnets 81 and 82 are arranged symmetrical with respect to the capstan 77 so that two opposite magnets are identical in magnetization. More specifically, the permanent magnet 81 has an N pole and an S pole aligned in the axial direction of the capstan 77 and the other permanent magnet 82 has two opposite poles aligned along the curved wall of the arcuate yoke 79, as shown in FIG. 6.

Figure 7:
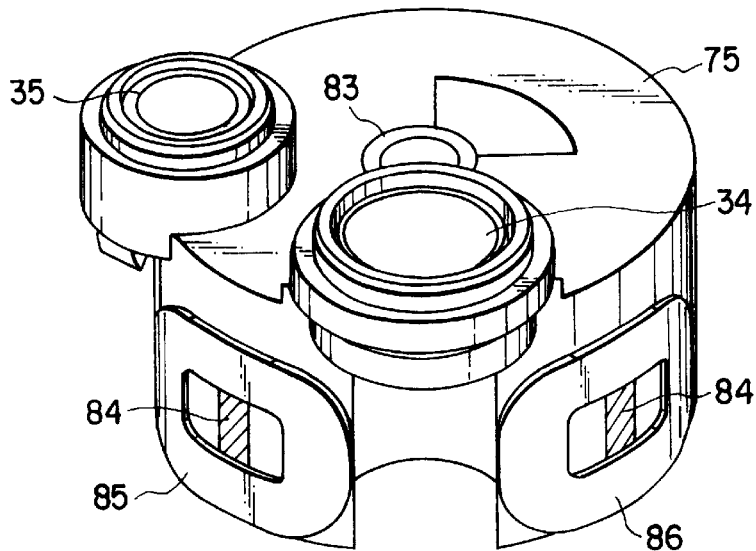
FIG. 7 is a perspective view of a lens holder of the optical pickup shown in FIG. 5.

The lens holder 75 is formed of substantially a tubular shape as shown in FIG. 7. The objective lens 35 for a CD type disk and the objective lens 34 for a super-density type disk or DVD are mounted on the upper side of the lens holder 75. The lens holder 75 is formed to have open space beneath the two objective lenses 34 and 35 for passing the laser beam. The two objective lenses 34 and 35 are arranged so that their optical axes stay on a circle line about the center of the lens holder 75. A bearing 83 is fixedly mounted to the center of the lens holder 75 and fitted onto the capstan 77. Accordingly, the lens holder 75 is joined by the bearing 83 to the capstan 77 for rotation and vertical movement. The lens holder 75 has four magnetic members 84 embedded into the side wall thereof and arranged symmetrical with respect to the capstan 77. The four magnetic members 84 are associated with two pairs of magnetic coils 85 and 86, each pair arranged symmetrical with respect to the capstan 77.

FIG. 8 illustrates an optical unit 90 linked with the optical lens actuator 73 installed in the optical pickup 32. The optical unit 90 includes a semiconductor laser 94 for emitting the laser beam focused on the optical disk 10 and is fixedly mounted in the interior of the carriage 72 which is a movable assembly. The laser beam emitted from the semiconductor laser 94 of the optical unit 90 is collimated by a collimator lens 91, reflected by a beam splitter 93, and directed to the outside of the optical unit 90. The laser beam derived from the optical unit 90 is incident on the objective lens 34 or 35 of the optical pickup 32 mounted on the carriage 72 and focused by the same on the recording track of the optical disk 10. A reflected light beam from the optical disk 10 is returned through the objective lens 34 or 35 to the optical unit 90. The reflected laser beam passes through the splitter 93 and is split by another beam splitter 95 into two components which are then focused by two condenser lenses 96 and 97 respectively and received by a first photodetector 98 and a second photodetector 99 respectively of the optical unit 90. In turn, the photodetectors 98 and 99 produce their respective detection signals from which the data, focusing error, and tracking error signals are extracted. The focusing error signal is indicative of dislocation of the objective lens 34 or 35 causing out of focus. The tracking error signal is indicative of displacement of the objective lens 34 or 35 from the recording track. For correcting the dislocation of the objective lens 34 or 35, either the coils 85 or the coils 86 are energized. This allows desired data to be accurately written on and read out from the recording track of the optical disk 10.

The movement of the optical pickup 32 will be explained in more details.

Figure 10A:
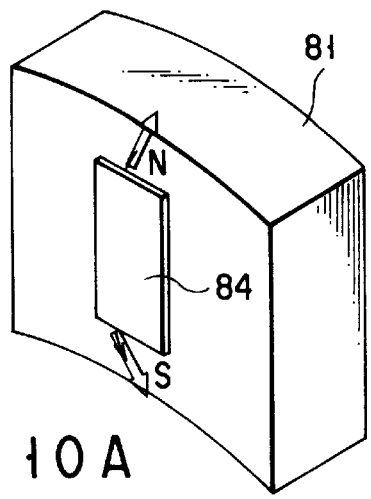
FIGS. 10A to 10F are a perspective view showing the action of magnetically lifting up the lens holder in an arrangement shown in FIG. 9.
Figure 10B:
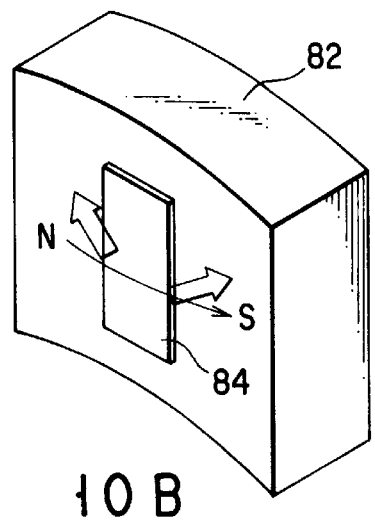
Figure 10C:
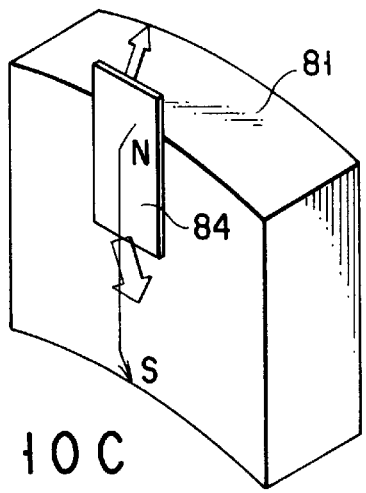
Figure 10D:
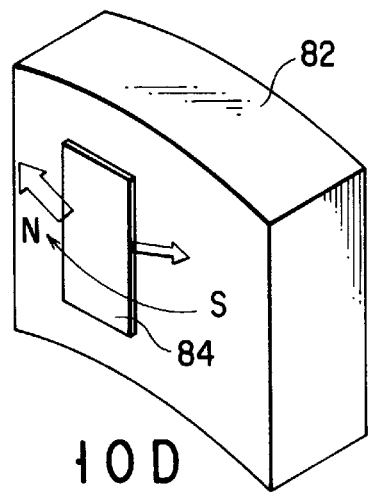
Figure 10E:
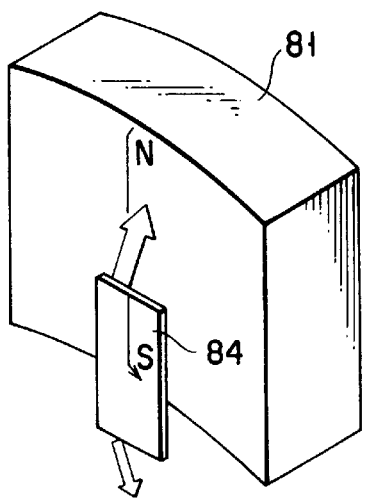
Figure 10F:
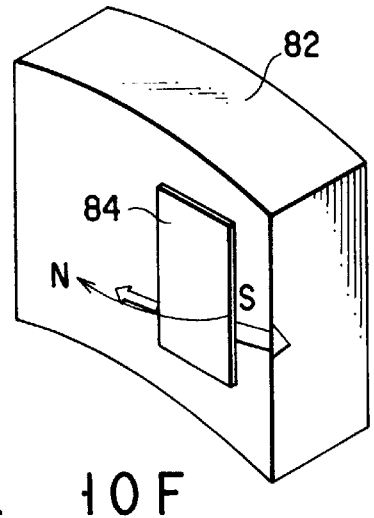

The explanation starts with magnetic lifting of the lens holder 75 in the lens holder support 74 by the action of a so-called magnetic spring. As prescribed and shown in FIG. 9, the lens holder support 74 includes the two pairs of the permanent magnets 81 and 82 arranged symmetrical with respect to the capstan 77 of the lens holder support 74, and the four magnetic members 84 mounted opposite to and spaced by a small distance from the corresponding magnets 81 and 82. The four magnetic members 84 are arranged symmetrical with respect to the capstan 77 and secured to the lens holder 75. More specifically, since the magnetic members 84 are constantly attracted by the permanent magnets 81 and 82, they all remain in a stable, neutral state as shown in FIGS. 10A and 10B, allowing the lens holder 75 to be magnetically held in the lens holder support 74. If the lens holder 75 is biased by an external disturbance, the magnetic member 84 is likely to move from the neutral location to an upper location as shown in FIG. 10C. However, as the magnetic force of pulling down the magnetic member 84 to the neutral location is generally greater than a downwardly biasing force, the magnetic member 84 stays in the neutral location. Similarly, even if the lens holder 75 is biased by an external disturbance, the magnetic member 84 is likely to move from the neutral location to a lower location as shown in FIG. 10E. However, as the magnetic force of pulling up the magnetic member 84 to the neutral location is generally greater than an upwardly biasing force, the magnetic member 84 stays in the neutral location. Also, when the lens holder 75 is biased by an external disturbance to cause the magnetic member 84 to move from the neutral location to a rightward location circumferentially as shown in FIG. 10D, the magnetic force of returning the magnetic member 84 to the neutral location is generally greater than a leftwardly biasing force thus allowing the magnetic member 84 to stay in the neutral location. Similarly, when the lens holder 75 is biased by an external disturbance to cause the magnetic member 84 to move from the neutral location to a leftward location circumferentially as shown in FIG. 10F, the magnetic force of returning the magnetic member 84 to the neutral location is generally greater than a rightwardly biasing force thus allowing the magnetic member 84 to stay in the neutral location.

The magnetic members 84 are arranged in axial symmetry and thus permit the lens holder 85 to rotate and shift the second objective lens 35 to the neutral location of the first objective lens 34 determined by the magnetic attraction or vice versa when the switching of the objective lens is requested. As the result, the second objective lens 35 will be effective with the setting of the first objective lens 34 in the optical unit 90.

Figure 13A:
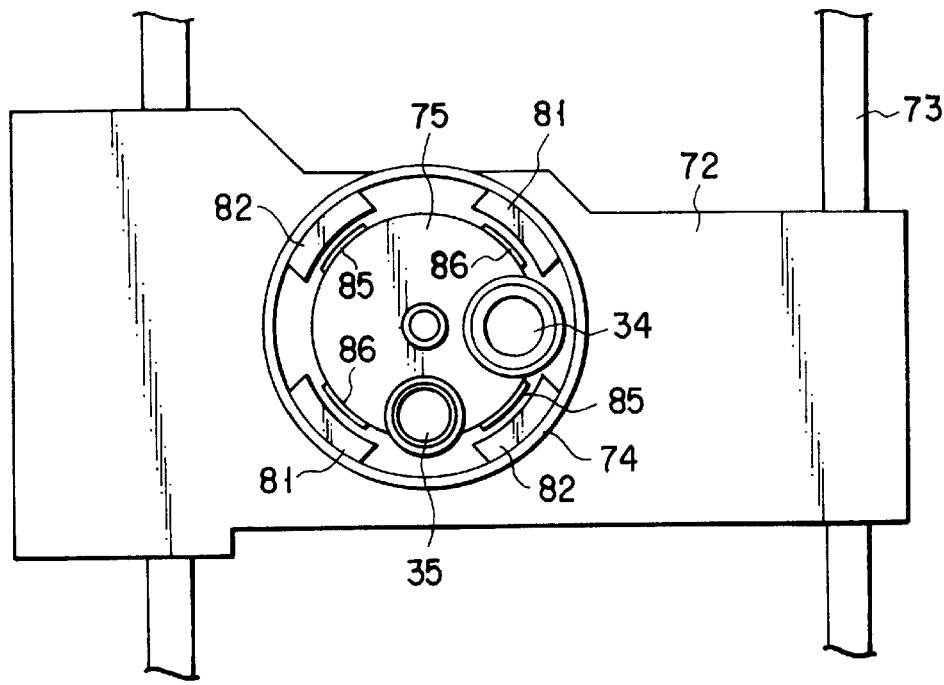
FIGS. 13A and 13B are a plan view showing the objective lens switching action in the objective lens drive apparatus.
Figure 13B:
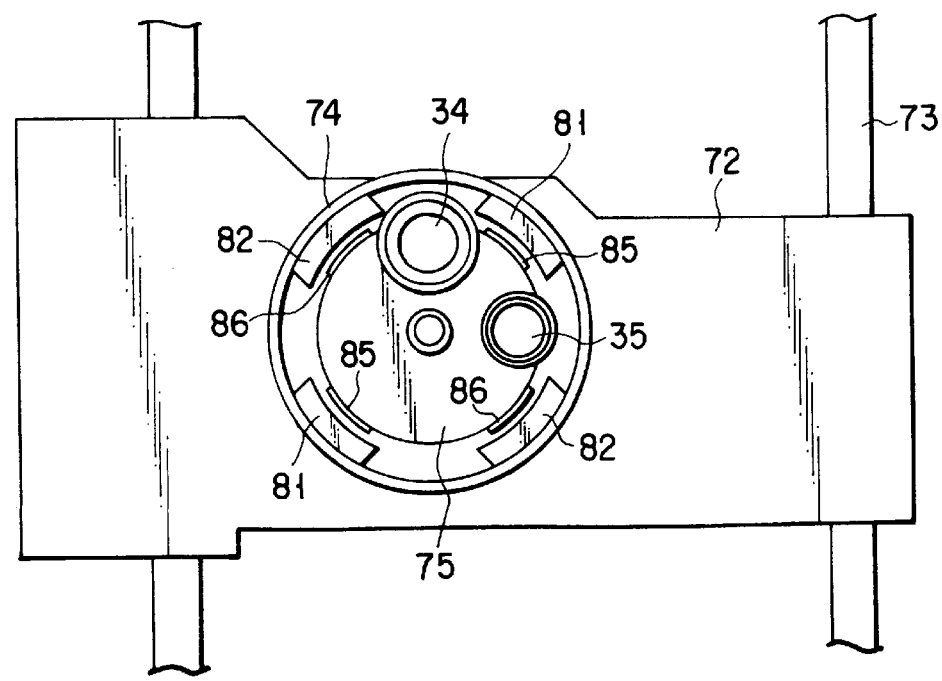

The switching between the objective lenses 34 and 35 is explained. It is assumed as shown in FIGS. 7 and 13A that the objective lens 34 of the large numerical aperture is set across the light path of laser beam with the circumferentially polarized magnets 82 facing the coils 85 and the axially polarized magnets 81 facing the coils 86. This produces the stable state holding the lens holder 75 stationary. When the coils 85 are energized at the time t1 with a forward current denoted by the arrow P0 in FIG. 12, its axially extending portions 85A and 85B arranged in parallel to the capstan 77 act with the magnetic fields developed by the permanent magnets 82 thus producing a circumferentially rotating force FR which causes the lens holder 75 to move. From t1 to t2, the lens holder 75 is circumferentially moved by the force FR produced by the coils 85. When the axially extending portion 85B of the coil 85 reaches the S pole of the corresponding magnet 82 at t2, the energizing current is reversed as shown in FIG. 12. The reverse of the current produces a force FR which causes the axially extending portion 85A at the trailing end of the coil 85 to repel the S pole of the magnet 82. Accordingly, the coil 85 is further moved to the neighbor permanent magnet 81. Then, the supply of current to the coil 85 is terminated at the time t3. Although the coil 85 may pass over the neutral location of the magnet 81 temporarily due to inertia force, it is eventually held at the neutral location by the magnetic action described previously with FIG. 10. As the result of the rotating movement of the lens holder 75, the coil 85 is located opposite to the permanent magnet 81 while the other coil 86 is opposite to the magnet 82 as shown in FIG. 13B. In other words, the objective lens 35 of the small numerical aperture is set across the light path of laser beam as has replaced the objective lens 34 of the large numerical aperture. The switching of the objective lens is completed.

In the arrangement of the two objective lenses 34 and 35 for switching one from the other by the rotating movement of the lens holder 75, any positional error between the two objective lenses 34 and 35 will be ignored when the clearance between the capstan 77 and the bearing 83 is less than 10 micrometers.

The focusing and tracking movement of the optical pickup 32 shown in FIG. 5 is explained.

While the objective lens 34 of the large numerical aperture is set across the light path of laser beam, as shown in FIGS. 7 and 13A, the coils 86 located opposite to the axially magnetized magnets 81 serve as focusing control coils and the coils 85 located opposite to the circumferentially magnetized magnets 82 serve as tracking control coils. If each of the coils 86 is loaded with a focusing coil drive current Fi in response to the focusing error signal, its circumferentially extending portions 86A and 86B act with the magnetic field developed by the corresponding magnet 81 thus generating an upward or downward force in accordance with the direction of the current Fi. This force causes the lens holder 75 to move upwardly or downwardly along its axial direction so that the objective lens 34 is correctly focused. When each of the coils 85 is loaded with a tracking coil drive current Ti in response to the tracking error signal, its axially extending portions 85A and 85B act with the magnetic field developed by the corresponding magnet 82 thus generating a leftward or rightward force in accordance with the direction of the current Ti. This force causes the lens holder 75 to move leftwardly or rightwardly along its circumference so that the objective lens 34 is correctly aligned with the recording track.

When the objective lens 34 has been dislocated, the objective lens 35 of the small numerical aperture is set across the light path of laser beam as shown in FIG. 13B. This time, the coils 85 located opposite to the axially magnetized magnets 81 serve as the focusing control coils and the coils 86 located opposite to the circumferentially magnetized magnets 82 serve as the tracking control coils. If each of the coils 85 is loaded with the focusing coil drive current Fi in response to the focusing error signal, its circumferentially extending portions 85C and 85D act with the magnetic field developed by the corresponding magnet 81 thus generating an upward or downward force in accordance with the direction of the current Fi. This force causes the lens holder 75 to move upwardly or downwardly along its axial direction so that the objective lens 35 is correctly focused. When each of the coils 86 is loaded with the tracking coil drive current Ti in response to the tracking error signal, its axially extending portions 86C and 86D act with the magnetic field developed by the corresponding magnet 82 thus generating a leftward or rightward force in accordance with the direction of the current Ti. This force causes the lens holder 75 to move leftwardly or rightwardly along its circumference so that the objective lens 35 is correctly aligned with the recording track.

As explained, the objective lens drive apparatus of the present invention allows the two different objective lenses 34 and 35 to be switched from one to the other by the action of the tracking control coils with the use of no external force, hence avoiding tilting of the optical axis caused by any extra stress and ensuring trouble-free reproduction of signals. Upon switching the objective lenses 34 and 35 from one to the other, the coils 85 and 86 are also shifted from the tracking control to the focusing control or vice versa whereby their efficiency of usage and their response to drive signals will be increased.

Also, either the two objective lenses 34 or 35 is driven by the same set of coils which performs the tracking or focusing control depending on the type of the objective lens, and by detecting its moving direction with a current supplied to either of the coils 85 or 86, its presence will readily be recognized without using any extra detecting means. Therefore, the type of the optical disk 10 to be scanned with the objective lens will be identified, either the super-density DVD type or the common CD type.

The action of selecting one of the objective lenses which matches the optical disk to be scanned after the objective lens drive is initialized with one objective lens set across the light path will now be explained referring to a flowchart of FIG. 14.

It is noted that the objective lens 34 of the large numerical aperture is suited for the super-density DVD type of the optical disk 10 and referred to as a DVD lens while the objective lens 35 of the small numerical aperture is suited for the common CD type and referred to as a CD lens. It is also assumed that the DVD lens 34 is selected and set as a main lens whenever the objective lens drive apparatus is initialized regardless of the type of the optical disk 10 to be scanned and thereafter, it is replaced with the objective lens 35 if desired.

Figure 14:
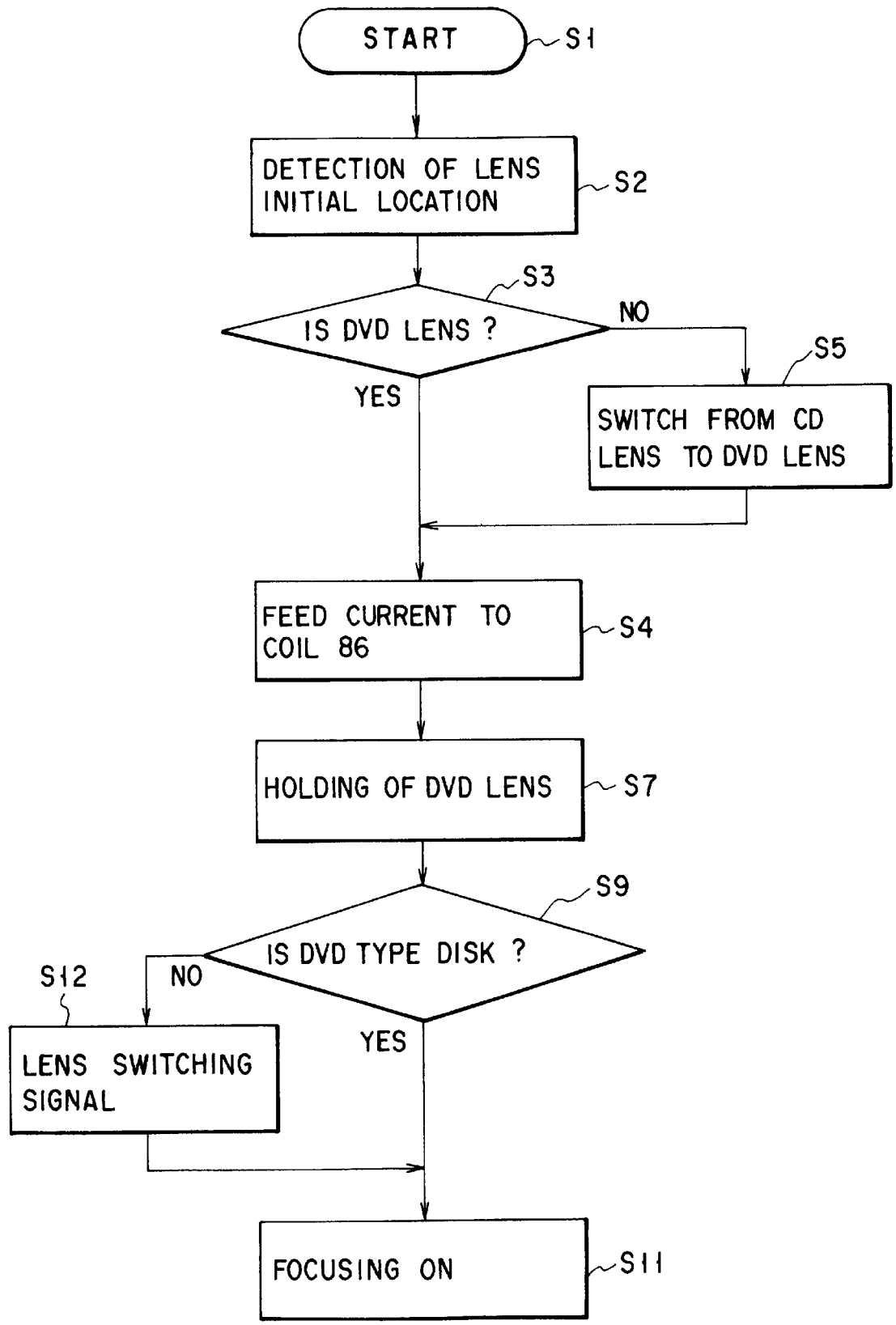
FIG. 14 is a flowchart showing a procedure of identifying the type of the objective lens of the objective lens drive apparatus shown in FIG. 5 and then the type of the optical disk.

The action starts with Step S1 of FIG. 14 when the optical disk system shown in FIG. 1 has been energized or the start of the action is triggered by a user operating the key control and display unit 4. After the lens initial location is detected at Step S2, it is examined at Step S3 whether the DVD lens 34 or the CD lens 35 sits at the location. When the DVD lens 34 is set across the light path of laser beam with the coils 86 located opposite to the focusing control magnets 81, the procedure goes to Step S4 since the supply of the switching signal of FIG. 12 to the coils 86 causes only the upward or downward movement of the lens holder 75. If the CD lens 35 is set across the light path with the coils 86 located opposite to the tracking control magnets 82, the supply of the switch signal of FIG. 12 to the coils 86 drives the lens holder 75 to turn and carry the DVD lens 34 to the light path as is executed at Step S5. As the DVD lens 34 is advanced to the light path of laser beam, the coils 86 are fed with a current at Step S4 and the DVD lens 34 is held at the neutral location at Step S7. In response to the holding action, the focusing error signal is produced. The focusing error signal is used at Step S9 for examining whether the optical disk 10 to be scanned is of the DVD type or the CD type. When it is judged at Step S9 that the optical disk 10 is of the DVD type, the procedure advances to Step S11 where the focusing action of the DVD type lens is carried out over the DVD type disk 10. If it is found at Step 9 that the optical disk 10 is of the CD type, the procedure moves to Step S12 where the lens switching signal is fed to the coils 86 for replacing the DVD lens 34 by the CD lens 35 which is then located across the light path. This is followed by focusing the CD lens 35 on the CD type of the optical disk 10 at Step S11.

Although the above procedure starts with the DVD lens 34 located across the light path of laser beam, it may be initialized with the CD lens 35 located across the light path.

The actual circuitry action of the above procedure will be explained referring to FIGS. 15, 16A, 16B, 16C, and 17. The CPU 50 delivers a switch signal to a switching circuit 108 which in turn connects the coils 86 to an amplifier circuit 107. Then, the CPU 50 referring to the ROM 52 produces and delivers the lens switching signal to a D/A converter 106 where it is converted into an analog form such as shown in FIG. 12. The analog lens switching signal is amplified by an amplifier circuit 107, passed through the switching circuit 108, and fed to the coils 86. From the lens switching signal supplied to the coils 86, it is examined whether or not the DVD lens 34 is set across the light path of laser beam in the initialization.

Figure 16A:
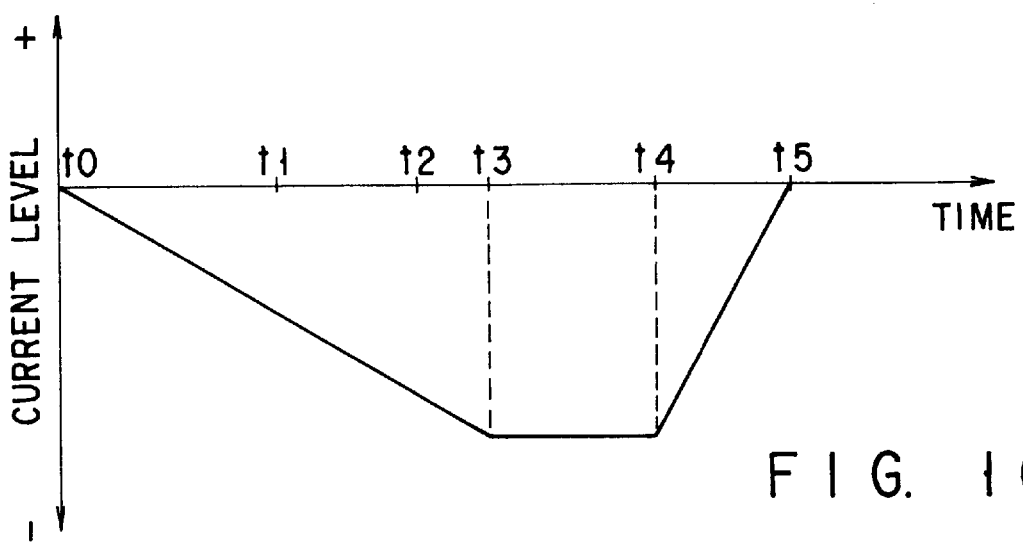
FIGS. 16A to 16C are a waveform diagram of signals in the circuit shown in FIG. 15.
Figure 16B:
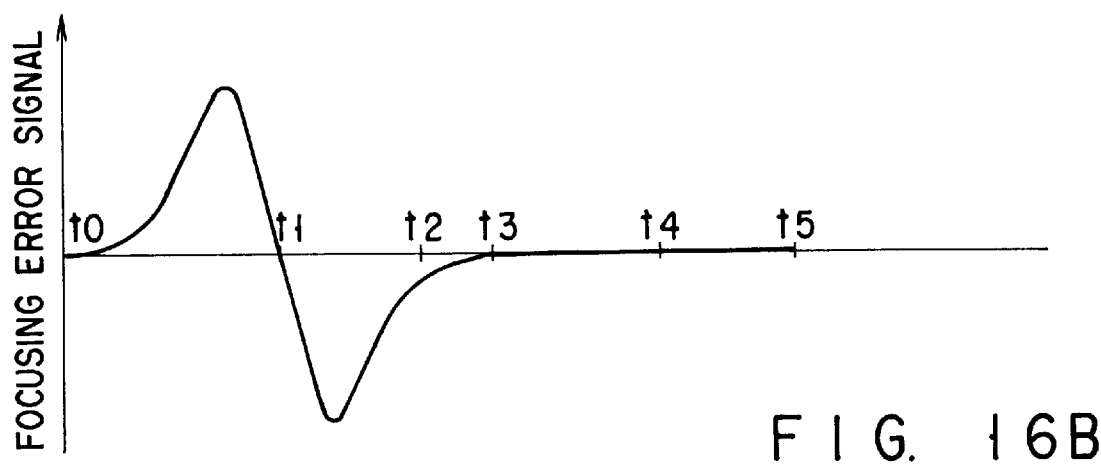
Figure 16C:
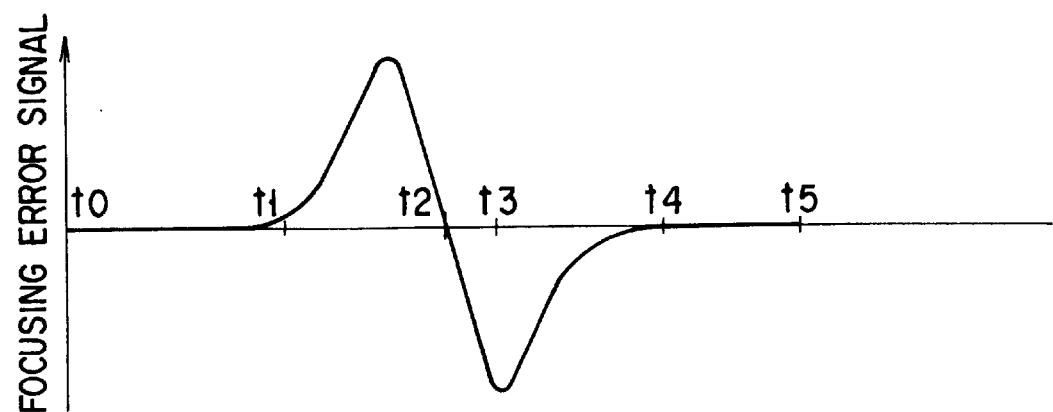

The CPU 50 referring to the ROM 52 produces a moving signal for the DVD lens 34 and delivers it to the D/A converter 106 where it is converted to an analog form shown in FIG. 16A. The moving signal of the D/A converter 106 is transmitted through the switching circuit 108 to the coils 86. Simultaneously, the release of the holding signal from the D/A converter 105 is monitored by a comparator 104 which in turn produces a time signal indicative of the time of release t0 and sends it to the CPU 50. Upon receiving the moving signal, the coils 86 starts to move the DVD lens 34 from a home position along the light path. In response to the movement of the DVD lens 34, a detection signal indicative of focusing error is released from a detector 99 to which the laser beam is directed through a focus detecting optical system 101 such as an astigmatism optical device. The detection signal is fed to a focusing error signal generator 102 which in turn produces a focusing error signal shown in FIG. 16B or 16C. The focusing error signal is also monitored by the comparator 104 where its zero crossing is specified at t1 in FIG. 16B and at t2 in FIG. 16C. The time point t1 or t2 is transmitted to the CPU 50 where it is compared with the predetermined origin t0 thus to identify the type of the optical disk 10, either the DVD type or the CD type.

When the DVD type of the optical disk 10 is loaded, the state of the switching circuit 108 remains unchanged and a switch 105 is closed to form a focusing servo circuit which allows the focusing signal to be fed back across a phase compensator circuit 103 to the amplifier 107. If the CD type of the optical disk 10 is loaded, the switching circuit 108 is shifted to another switching state for connecting the amplifier 107 to the coils 85. Also, the switch 105 is closed forming a focusing servo circuit where the focusing signal is fed back across the phase compensator 103 to the amplifier 107.

The type of the optical disk 10 can hence be identified from a combination of t0, t1, and t2. As described previously, the transparent substrate 14 of the DVD type of the optical disk 10 is as relatively thin as 0.6 mm and allows the focusing error signal to be generated at a higher rate of response when the DVD lens 34 is held in response to the holding signal of FIG. 16A. Accordingly, its zero-crossing signal appears in a short period (from t0 to t1). However, the transparent substrate 14 of the CD type of the optical disk 10 is as relatively thick as 1.2 mm and allows the focusing error signal to be generated with a delay of time after the DVD lens 34 is held in response to the holding signal of FIG. 16A. Accordingly, its zero-crossing signal appears in a period (from t0 to t2) which is longer than (t0 to t1). This permits the CPU 50 to identify the type of the optical disk 10 by comparing the given period (t0 to t1) or (t0 to t2) with the reference time T0 saved in the ROM 52.

Figure 17:
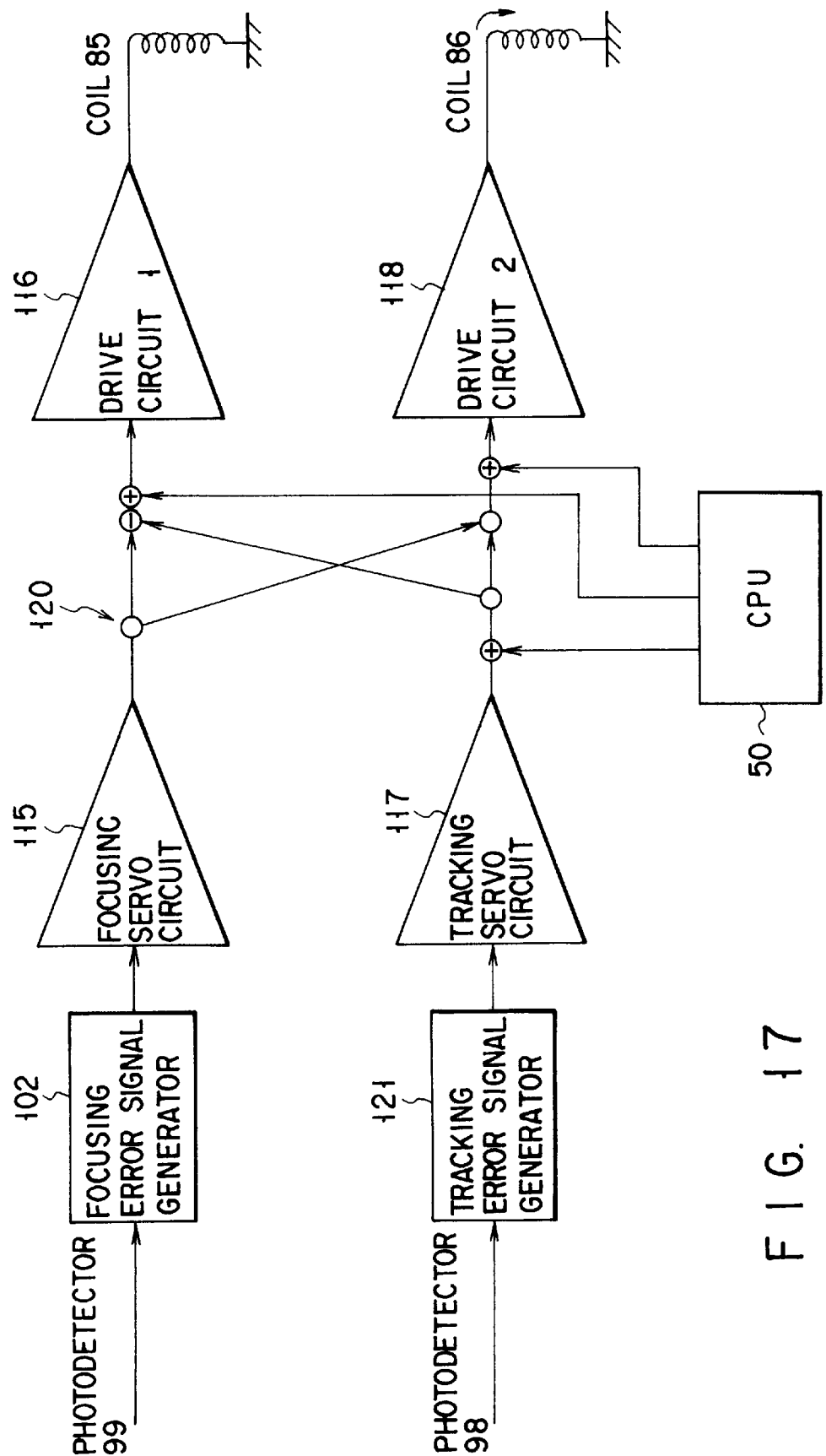
FIG. 17 is a block diagram of a circuit for switching the drive system of the optical pickup according to the action of identification shown in FIG. 14.

FIG. 17 is a schematic block diagram showing the switching to a circuit corresponding to an identification signal indicative of the focusing or tracking servo circuit. In the circuitry arrangement of FIG. 17, a focusing servo loop is formed by the focusing error signal generator 102, a focusing servo circuit 115, either of the coils 86 and 86, and a drive circuit 116 or 118 connected to the corresponding coil. Also, a tracking servo loop is formed by a tracking error signal generator 121, a tracking servo circuit 117, either of the coils 86 and 86, and the drive circuit 116 or 118 connected to the corresponding coil. As apparent from FIG. 17, a servo loop switching circuit 120 is connected between the focusing and tracking servo circuits 115 and 117 and the two drive circuits 116 and 118. The servo loop switching circuit 120 is responsive to the identification signal indicative of the type of the objective lens 34 or 35 and supplied from the CPU 50 for selecting one of the two servo loops. When the coil 85 is actuated as the focusing coil, the CPU 50 drives the servo loop switching circuit 120 to connect the focusing servo circuit 115 to the drive circuit 116 of the coil 85 and the tracking servo circuit 117 to the drive circuit 118 of the coil 86. If the coil 85 is actuated as the tracking coil, the CPU 50 causes the servo loop switching circuit 120 to connect the tracking servo circuit 117 to the drive circuit 116 of the coil 85 and the focusing servo circuit 115 to the drive circuit 118 of the coil 86.

Figure 18:
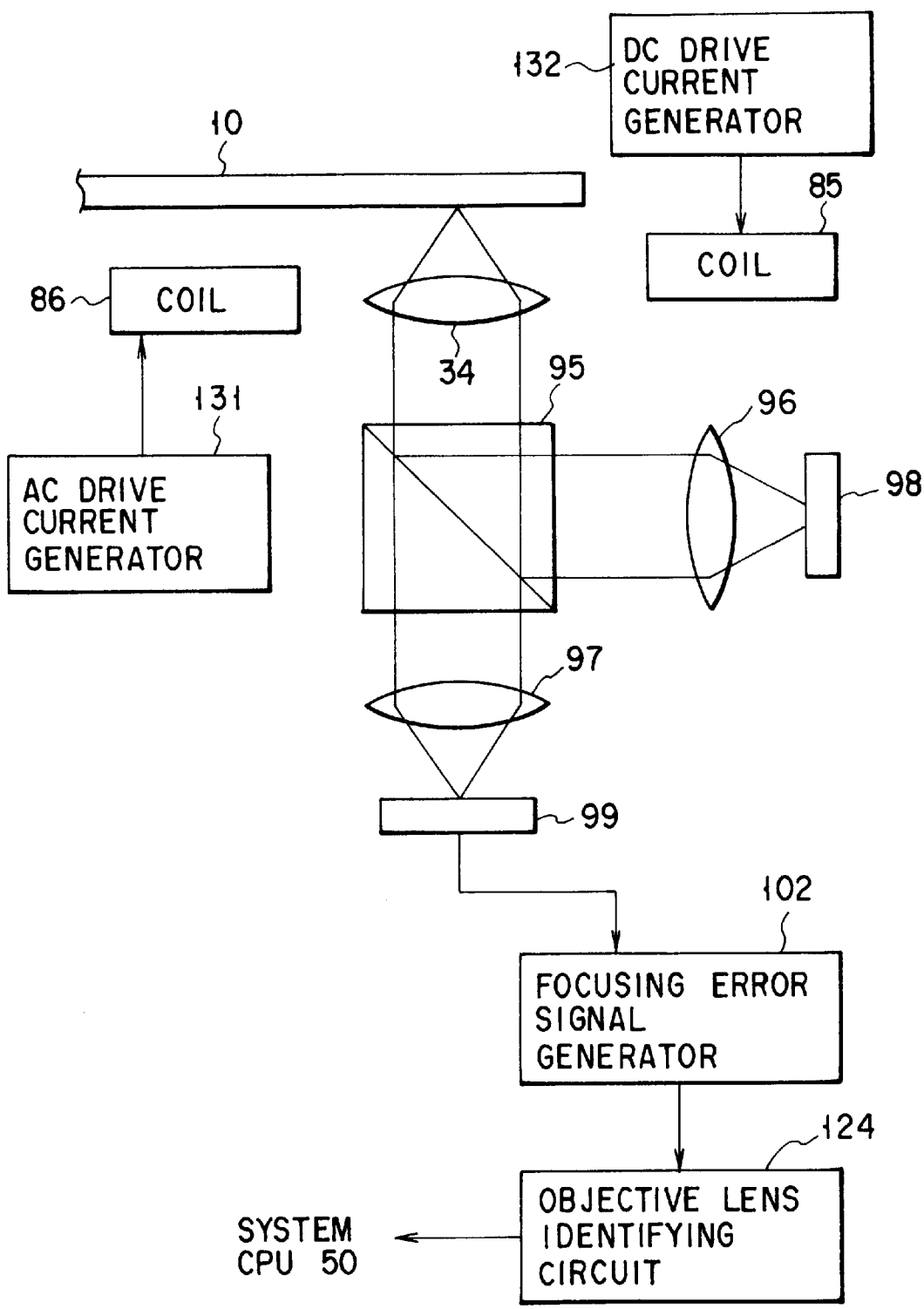
FIG. 18 is a block diagram of a circuit for determining which objective lens is located across the light path of laser beam in the optical pickup shown in FIG. 5.

Although the embodiment described with FIGS. 14 to 17 permits the DVD lens 34 to be set across the light path in the initialization, such a circuitry arrangement as shown in FIG. 18 may be used for identifying the objective lens 34 or 35 in the initialization and displaying it on the external display 4.

The circuitry arrangement shown in a block diagram of FIG. 18 includes a circuit mounted in the optical pickup 32 of FIG. 5 for identifying the type of the objective lens set across the light path. In the identifying circuit, an AC drive current generating circuit 131 is connected to the coil 86 while a DC drive current generating circuit 132 is connected to the coil 85. It is now assumed that the objective lens 34 of the large numerical aperture is set over the optical disk 10 of the DVD type with the coil 86 located opposite to the focusing control magnet 81 and the coil 85 located opposite to the tracking control magnet 82. When the coil 85 is energized with a DC drive current of the DC drive current generating circuit 132, it acts with the tracking control magnet 82 causing the lens holder 75 to be slightly biased from the neutral location to the left or right. The DC drive current is preferably smaller in magnitude than the objective lens switching signal but enough to maintain the interaction between the coil 85 and the tracking control magnet 82. Then, upon the coil 86 being energized with an AC drive current of the AC drive current generating circuit 131, it acts with the focusing control magnet 81 causing the lens holder 75 to finely move upward and downward. As the lens holder 75 moves upward and downward, the objective lens 34 is lifted up and down thus causing the photodetector 99 to generate the detection signal. In response to the detection signal, the focusing error signal generator 102 produces a series of the focusing error signals indicative of the upward and downward movement of the objective lens 34. From the series of the focusing error signals, the objective lens identifying circuit denoted at 124 judges that the objective lens 34 of the large numerical aperture for scanning the DVD type of the optical disk 10 is currently set across the light path.

If the objective lens 35 of the small numerical aperture for scanning the CD type of the optical disk 10 is set across the light path, the coil 85 is located opposite to the focusing control magnet 81 and the coil 86 is located opposite to the tracking control magnet 82. When the coil 85 is energized with a DC drive current of the DC drive current generating circuit 132, it acts with the focusing control magnet 81 causing the lens holder 75 to be slightly biased from the neutral location to upper or lower. Then, upon the coil 86 being energized with an AC drive current of the AC drive current generating circuit 131, it acts with the tracking control magnet 82 causing the lens holder 75 to gently move leftward and rightward. The leftward and rightward movement of the lens holder 75 corresponds to the tracking action of the objective lens 35. This allows the focusing error signal generator 102 to produces no repeating of the focusing error signals. As the focusing error signal is not repeated, the objective lens identifying circuit 124 judges that the objective lens 35 for scanning the DVD type of the optical disk 10 is currently located across the light path.

The identification signal of the objective lens identifying circuit 124 is transmitted to the system CPU 50 which in turn examines whether it corresponds to the DVD type or the CD type of the optical disk 10 which has been loaded according to an entry signal from the key control and display unit 4. When the objective lens set across the light path is suited for the type of the optical disk 10, the playback action is directly commenced. If not, the objective lens switching signal of FIG. 12 is produced to switch to the corresponding type of the objective lens.

Figure 19:
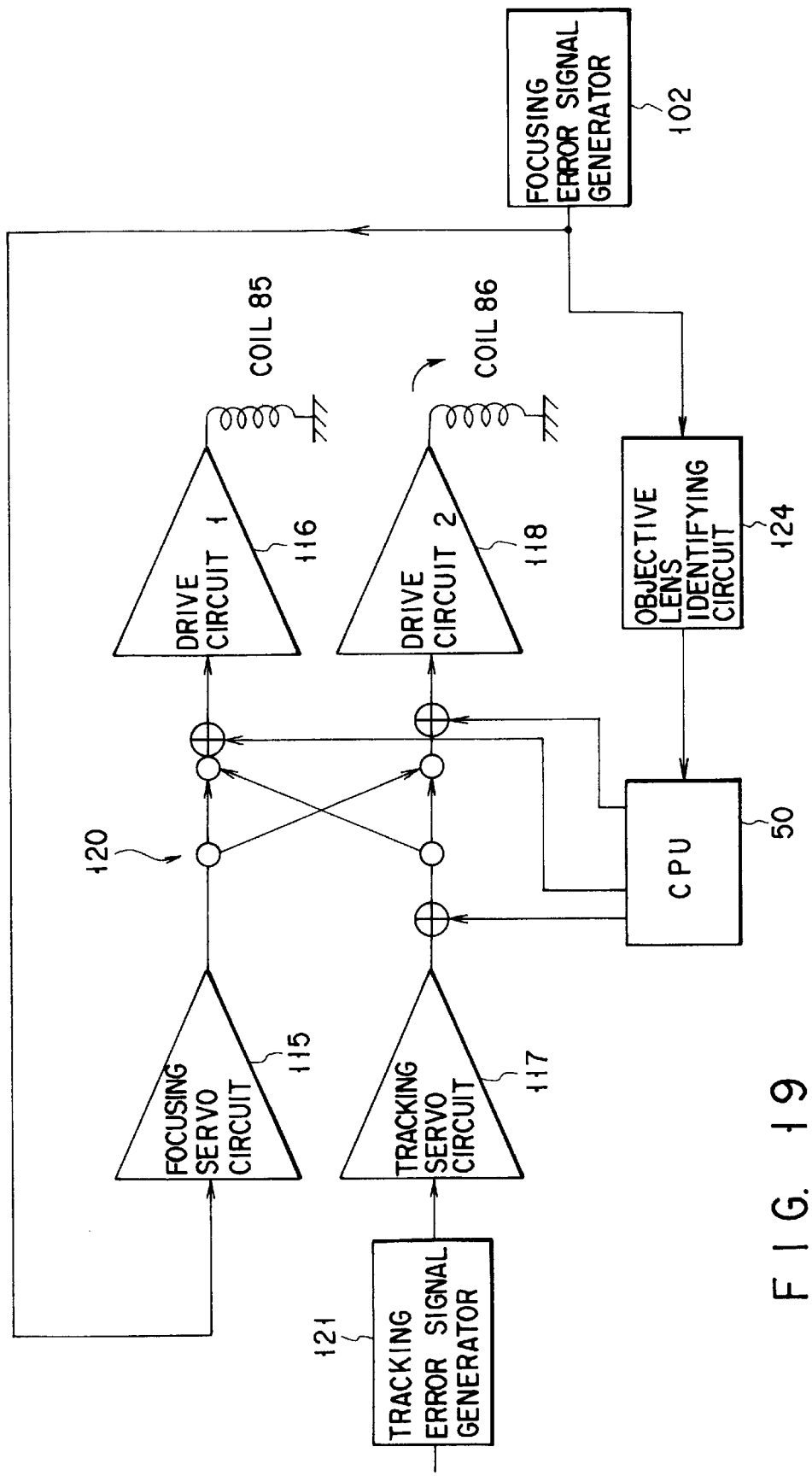
FIG. 19 is a block diagram of a circuit for switching the drive system of the optical pickup according to the action of determining shown in FIG. 18.

FIG. 19 is a block diagram showing a circuitry arrangement for switching the drive circuit in response to the objective lens switching signal. In the circuitry arrangement of FIG. 19, a focusing servo loop is formed by the focusing error signal generator 102, the focusing servo circuit 115, either of the coils 85 and 86, and the drive circuit 116 or 118 connected to the corresponding coil. Also, a tracking servo loop is formed by the tracking error signal generator 121, the tracking servo circuit 117, either of the coils 86 and 86, and the drive circuit 116 or 118 connected to the corresponding coil. As apparent from FIG. 19, the servo loop switching circuit 120 is connected between the focusing and tracking servo circuits 115 and 117 and the two drive circuits 116 and 118. The servo loop switching circuit 120 is responsive to the identification signal of the objective lens identifying circuit 124 indicative of the type of the objective lens 34 or 35 for allowing the CPU 50 to selectively activate the servo loop. When the coil 85 is actuated as the focusing coil, the CPU 50 drives the servo loop switching circuit 120 to connect the focusing servo circuit 115 to the drive circuit 116 of the coil 85 and the tracking servo circuit 117 to the drive circuit 118 of the coil 86. If the coil 85 is actuated as the tracking coil, the CPU 50 causes the servo loop switching circuit 120 to connect the tracking servo circuit 117 to the drive circuit 116 of the coil 85 and the focusing servo circuit 115 to the drive circuit 118 of the coil 86.

Figures 22A, 22B, 22C:
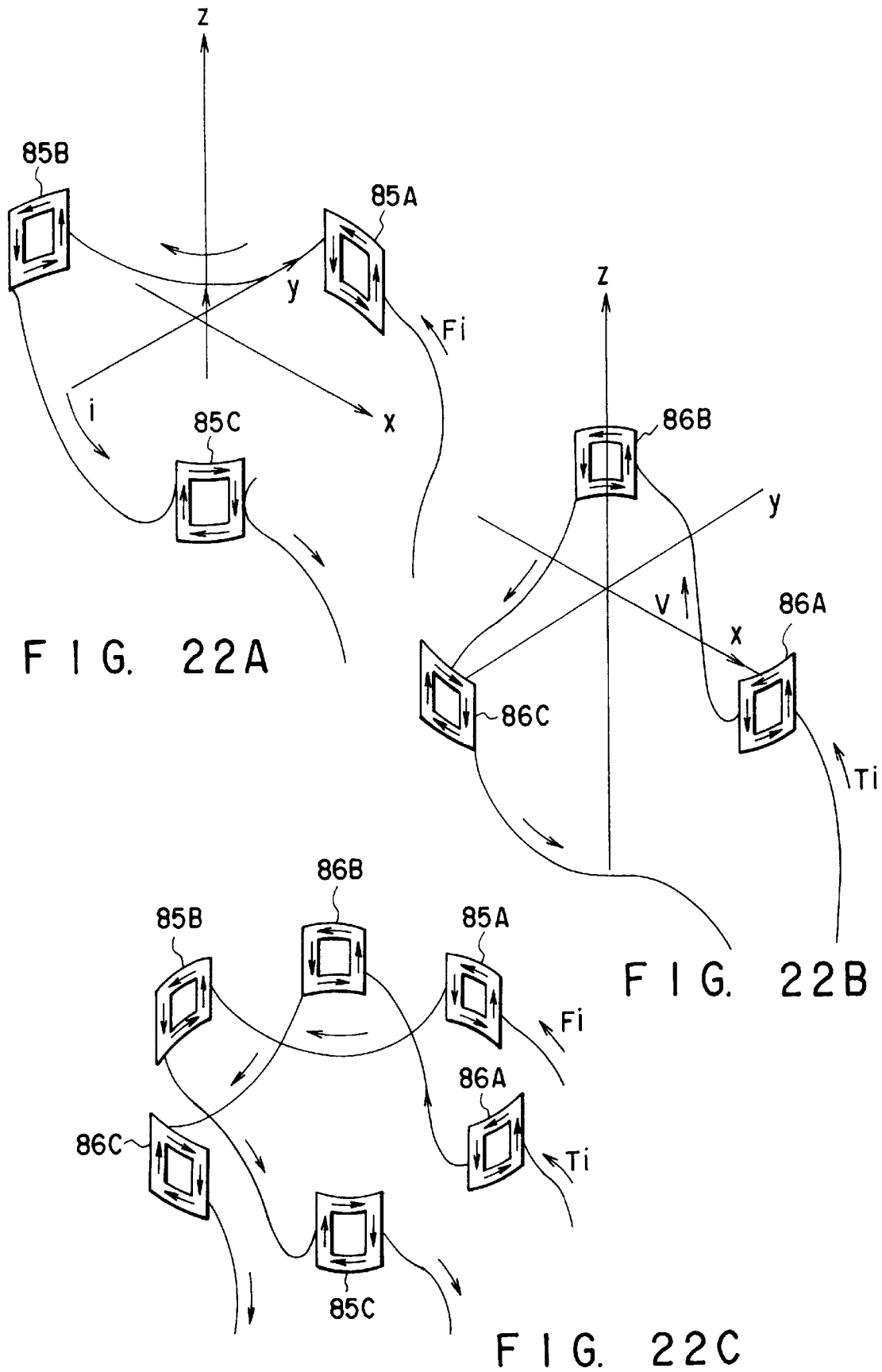
FIGS. 22A, 22B, and 22C are perspective views of coil arrangements in the objective lens drive apparatus shown in FIG. 20.

Although the optical pickup 32 of FIG. 5 is capable of switching between the two different type objective lenses 34 and 35, it may includes three, shown in FIG. 20, or more objective lenses to be selected. An embodiment of FIG. 20 includes three different objective lenses 34, 35A, and 35B fixedly mounted on the lens holder 75 with their respective optical axes spaced 60 degrees from one another about the center of rotation. The lens holder 75 is accommodated in a lens holder support 74. The three objective lenses 34, 35A, and 35B may be of a DVD type, a CD type, and a RAM DVD type respectively. The RAM DVD type objective lens is designed for focusing a beam of writing light on a rewritable type of the optical disk 10. Also, as shown in FIG. 21A, six magnetic members 84 providing a magnetic spring effect are embedded in the side of the lens holder 75 so that they are arranged at equal intervals of 60 degrees about the axis of the lens holder 75. The magnetic members 84 are associated with three coils 85A, 85B, and 85C of a first group and three coils 86A, 86B, and 86C of a second group respectively which are spaced 60 degrees from one another about the axis. The coils 85A, 85B, and 85C of the first group are connected in series to one another as shown in FIGS. 22A, 22B, and 22C. Similarly, the coils 86A, 86B, and 86C of the second group are connected in series to one another. Also, three focusing control permanent magnets 81 and three tracking control permanent magnets 82 are alternately mounted to the inner side of a wall of the lens holder support 74, as best shown in FIG. 21B. The six magnets 81 and 82 like the coils 84 and 85 are arranged symmetrical in respect to the axis 75. A sensor unit 150 shown in FIG. 23 is mounted to the inner side of the lens holder support 74. Three, first, second and third, mirrors 162A, 162B, and 162C for their respective objective lenses 34, 35A, and 35B are mounted to the side of the lens holder 75 between the two adjacent coils 85C and 85A, 85A and 85B, and 85B and 85C respectively so that they are spaced 60 degrees about the axis of rotation from one another. More specifically, the first 162A, the second 162B, and the third mirror 162C are located at an upper, a lower, and a center region of the side of the lens holder 75 as shown in FIG. 24. The sensor unit 150 includes two, first and second, LEDs 156 and 158 for emitting light to the first 162A, the second 162B, and the third mirror 162C, and four detectors 152A, 152B, 154A, and 154B for receiving reflected light from the first 162A, the second 162B, and the third mirror 162C, and detecting the corresponding objective lenses 34, 35A, and 25B. The two detectors 152A and 152B of a first group are located in an upper region of the sensor unit 150 while the other two 154A and 154B are located in a lower region of the same. The first LED 156 is interposed between the two detectors 152A and 152B of the first group while the second LED 158 is interposed between the two detectors 154A and 154B of the second group.

In a structure shown in FIG. 20, when the focusing drive signal Fi is fed to, for example, the coils 86 located opposite to the focusing control magnets 81 as shown in FIGS. 22A and 22C, the lens holder 75 moves upward and downward to maintain its focusing state. When the tracking drive signal Ti is fed to, for example, the coils 85 located opposite to the tracking control magnets 82 as shown in FIGS. 22B and 22C, the lens holder 75 turns slightly to maintain its tracking state. As described previously, the coils 85 located opposite to the tracking control magnets 82 causes a turning movement of the lens holder 75 when is loaded with the switching signal of FIG. 12, hence switching the objective lens 34 set across the light path to another objective lens 35A or 35B.

Arranged in a specific relationship are the first 156 and the second LED 158, the first 162A, the second 162B, and the third mirror 162C, and the four detectors 152A, 152B, 154A, and 154B. When the first objective lens 35A is selectively set across the light path of a semiconductor laser 94 as desired, the light from the first 156 and the second LED 158 or particularly from the first LED 156 is reflected by the mirror 162A and most of the reflected light is received by the detectors 152A and 152B. If the second objective lens 34 is switched from the first objective lens 35A and set across the light path as desired, the light from the first 156 and the second LED 158 or particularly from the second LED 158 is reflected by the mirror 162B and most of the reflected light is received by the detectors 154A and 154B. Further, when the third objective lens 35B is switched from the second objective lens 34 is set across the light path as desired, the light from the first 156 and the second LED 158 is reflected by the mirror 162C and most of the reflected light is received by all the detectors 152A, 152B, 154A, and 154B.

Figure 25:
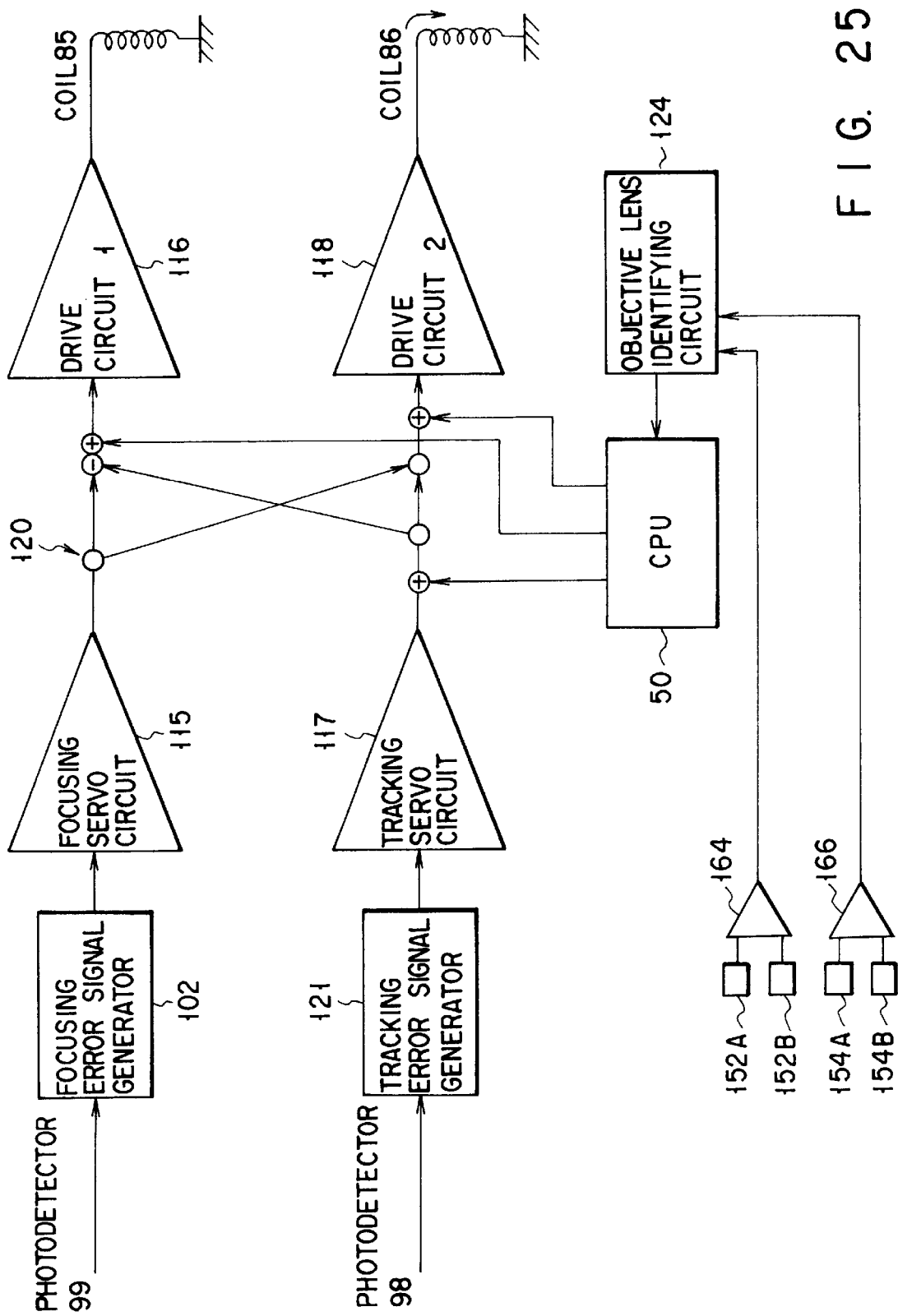
FIG. 25 is a block diagram of a circuit for switching the drive system of the optical pickup in the objective lens drive apparatus shown in FIG. 20.

As shown in FIG. 25, the detectors 152A and 152B are connected via an adder 164 to the objective lens identifying circuit 124 while the detectors 154A and 154B are connected via an adder 166 to the same. Accordingly, the objective lenses 34, 35A, and 35B in use generate corresponding signals. When the first objective lens 35A is in use, two detection signals are produced by their respective detectors 152A and 152B and fed to the first adder 164 which in turn delivers a first enable signal E1. At the time, the other two detectors 154A and 154B generate no detection signals and the second adder 166 hence delivers a disable signal U0. The objective lens identifying circuit 124 judges from a combination of the first enable signal E1 and the disable signal U0 that the first objective lens 35A is set across the light path. Similarly, if the second objective lens 34 is in use, two detection signals from the detectors 154A and 154B are fed to the second adder 166 which in turn delivers a second enable signal E2. At the time, the other two detectors 152A and 152B generate no detection signals, causing the first adder 164 to produce a disable signal U0. The objective lens identifying circuit 124 then judges from a combination of the second enable signal E2 and the disable signal U0 that the second objective lens 34 is located across the light path. When the third objective lens 35B is in use, two detection signals from the detectors 152A and 152B are transmitted to the first adder 164 which in turn delivers a first enable signal E01 and simultaneously, two detection signals from the detectors 154A and 154B are fed to the second adder 166 which in turn delivers a second enable signal E01.

Consequently, the objective lens identifying circuit 124 judges from a combination of the two, first and second, enable signals E01 that the third objective lens 35B is set across the light path. If none of the three objective lenses 34, 35A, and 25B is set across the light path as requested, the four detectors 152A, 152B, 154A, and 154B produce no detection signals causing the first 164 and the second adder 166 to deliver two, first and second, disable signals U0. The objective lens identifying circuit 124 judges from a combination of the two disable signals U0 that no objective lens is selected and located across the light path. Similar to the previous embodiment, the identification signal indicative of the objective lens in use is produced and delivered by the objective lens identifying circuit 124 thus allowing the CPU 50 to perform correctly the action of selecting the desired objective lens. The action of selecting the desired objective lens is identical to that described in the previous embodiments and will be no more explained.

The permanent magnets and the coils of the objective lens switching and driving apparatus described above are preferably 2n when the number of the objective lenses is n as are arranged on a circle forming magnetic circuits. This allows each pair of the magnetic and the coil located opposite to each other to form a magnetic circuit for the focusing or tracking control. Hence, a chain of the magnetic circuits will equally act on and thus drive the lens holder in a good balance and at a high accuracy for both the focusing and tracking control movements, improving the oscillating and driving characteristics.

As set forth above, the objective lens drive apparatus of the present invention permits a desired objective lens to be selected from two or more different type objective lenses mounted on the lens holder and located across the light path by a switching signal enabled for turning the lens holder. Accordingly, the objective lens drive apparatus can be initialized and after the initialization, can control the optical pickup by an appropriate manner.

Also, the type of an optical disk to be scanned can be identified through monitoring the focusing signal produced in response to a signal for holding the selected objective lens. The resultant identification signal is thus used for controlling the optical pickup.

According to the present invention, the coils which perform the tracking control also serve as drive sources for switching to the desired objective lens, thus contributing to the simple construction of the apparatus. Particularly, since the clearance between the capstan and the bearing is as small as less than 10 micrometers in the turning movement of the lens holder, any positional error between the first and second objective lenses will be ignored.

The first objective lens is replaced by the second objective lens with its neutral location defined by the magnetic attraction registering with that of the second objective lens. This allows the second objective lens to be set in an alignment identical to that determined with the first objective lens in the optical unit 5.

Also, the coils when switching the objective lens can shift from the tracking control to the focusing control or vice versa, thus increasing the efficiency of their use and improving the response to the driving signal. Each set of the coils performs the tracking or focusing control action depending on the type of the objective lens in use. Hence, the type of the objective lens can be identified by detecting the movement of the objective lens with either set of the coils energized, while eliminating the use of an extra detector.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A drive apparatus comprising:

a lens holder for carrying a first objective lens and a second objective lens;

means for allowing the lens holder to be turned around a rotation axis and moved along a direction of the axis;

means for generating a tracking signal and a focusing signal;

a driving assembly comprising:

a first electromagnetic driving means having first magnets and first coils for turning the lens holder about the rotation axis in response to the tracking signal in a first mode in which the first objective lens is selected to be positioned at a predetermined location; and a second electromagnetic driving means having second magnets and second coils for moving the lens holder parallel to the rotation axis in response to the focusing signal in the first mode;

wherein the first magnets and the second coils form a third electromagnetic driving means for turning the lens holder about the rotation axis in response to the tracking signal in a second mode in which the second objective lens is selected to be positioned at the predetermined location; and the second magnets and the first coils form a fourth electromagnetic driving means for moving the lens holder parallel to the direction of the rotation axis in response to the focusing signal in the second mode; and means for feeding an initializing signal to one of the first and second coils to energize the one of the first and second coils so that one of the first and second modes is maintained or the other of the first and second modes is changed to the one of the first and second modes.

2. A drive apparatus according to claim 1, wherein the first magnets, first coils, second magnets, and second coils are arranged symmetrical in respect to the axis of rotation.

3. A drive apparatus according to claim 1, further comprising a switching circuit for when the objective lens is selected as identified, switching the connection of at least either group of the first and second coils from a control circuit for the tracking control to a control circuit for the focusing control and the other group from the circuit for the focusing control to the circuit for the tracking control.

4. A drive apparatus comprising:
first and second objective lenses having different optical characteristics respectively for focusing a light beam on an optical recording medium, each lens having an optical axis;
a lens holder having an axis of rotation and supporting the first and second objective lenses, said lens holder capable of moving in a direction of one of the lens optical axes and turning about the axis of rotation;
an optical system defining an optical path along which a light beam is transmitted to a selected one of the first and second objective lens;
means for generating a tracking signal and a focusing signal;
means for generating a switching signal;
driving means comprising first magnets and first coils facing the first magnets respectively, for turning the lens holder about the axis of rotation in response to the tracking signal in a first selection mode in which the objective lens is located in the optical path;
said driving means further comprising second magnets and second coils facing the second magnets respectively, for moving the lens holder along one of the lens optical axes in response to the focusing signal in the first selection mode,
wherein when the first magnets and first coils energized by the switching signal rotate the lens holder to change from the first selection mode to a second selection mode in which the second objective lens is located in the optical path, the first coils face the second magnets, respectively, and the second coils face the first magnets respectively, the first magnets and the second coils turn the lens holder about the axis in response to the tracking signal in the second selection mode, and the second magnets and the first coils move the lens holder along one of the lens optical axes in response to the focusing signal in the second selection mode; and
means for generating an initializing signal to energize the second coils so that the lens holder is rotated in the second selection mode to chance from the second selection mode to the first selection mode, and the lens holder is moved along one of the lens optical axes in the first selection mode to maintain the first selection mode.

5. A drive apparatus according to claim 4, further comprising means for sensing a light beam reflected from the recording medium to generate a focusing error signal;
means for supplying an alternating current to one of the first and second coils; and
means for identifying a type of the selected objective lens by monitoring the focusing error signal upon the one of the first and second coils being energized with the alternating current.

6. A drive apparatus according to claim 4, further comprising a switching circuit for switching the connection between the first and second coils and said tracking and focusing signal generating means.

7. A drive apparatus according to claim 6, wherein the switching circuit is connected in the proceeding stage of a power element for energizing the coils.

8. A drive apparatus according to claim 4, wherein the first magnets and second coils energized with the switching signal rotate the lens holder to change from the second selection mode to the first selection mode.

9. A driving apparatus comprising:
for holding first and second optical systems having different numerical apertures, respectively;
means for rotating said holding means around a rotational axis;
means for generating an initializing signal to initialize the driving apparatus; and
means for energizing said rotating means in response to the initializing signal to locate the first optical system in a predetermined position,
wherein said rotating means comprises:
first driving means having first magnets and first coils for turning said holding means about the rotational axis in a first mode in which the first optical system is selected; and
second driving means having second magnets and second coils for moving said holding means along the rotational axis in the first mode in which the first optical system is selected; wherein:
the first magnets and the second coils act in a combination to form a third driving means for turning said holding means about the rotational axis in a second mode in which the second optical system is selected;
the second magnets and the first coils act in a combination to form a fourth driving means for moving said holding means along the rotational axis in the second mode in which the second optical system is selected; and
the second coils supplied with the initializing signal causes said holding means to either maintain the first mode or change from the second mode to the first mode.

10. A driving apparatus according to claim 9, wherein said first optical system comprises a first objective lens having a first numerical aperture and second optical system comprises a second objective lens having a second numerical aperture.

11. A driving apparatus according to claim 9, further comprising:
emitting means for emitting the light beam to said first optical system which is located in the predetermined position.

12. A driving apparatus comprising:
rotary structure having a rotation center;
means for allowing said rotary structure to be rotated between first and second positions around the rotating axis and to be shifted along the rotating axis;
driving means including first and second magnets and first and second coils, the first magnet and first coil constituting a first electromagnet driving means for rotating the rotary structure and the second magnet and second coil constituting a second electromagnet driving means for shifting the rotary structure, when the first potion is selected, and the first magnet and second coil constituting a third electromagnet driving means for rotating the rotary structure and the second magnet and first coil constituting a fourth electromagnet driving means for shifting the rotary structure, when the second potion is selected;

first generating means, selectively connected to one of the first and second coils, for generating a first driving signal to energize the selected one of the first and second coils to rotate the rotary structure;

second generating means, selectively connected to the other one of the first and second coils, for generating a second driving signal to energize the selected the other one of the first and second coils to shift the rotary structure; and connecting means for connecting the first generating means to the first coil and the second generating means to the second coil when the first position is selected, and connecting the second generating means to the first coil and the second generating means to the first coil when the second position is selected.

13. A driving apparatus according to claim 12, further comprising:

sensing means for sensing one of the first and second positions to generate a sensing signal; and control means for controlling the connecting means in response to the sensing signal.

14. A driving apparatus according to claim 12, wherein the first generating means includes means for generating a third driving signal for rotating the rotary structure to switch a position of the rotary structure from the first position to the second position or from the second position to the first position.

* * * * *